(12) United States Patent
Aksyuk et al.

(10) Patent No.: US 9,778,477 B2
(45) Date of Patent: Oct. 3, 2017

(54) HOLOGRAPHIC MEMS OPERATED OPTICAL PROJECTORS

(75) Inventors: Vladimir Anatolyevich Aksyuk, Westfield, NJ (US); Robert Eugene Frahm, Flemington, NJ (US); Omar Daniel Lopez, Summit, NJ (US); Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2638 days.

(21) Appl. No.: 11/713,155

(22) Filed: Mar. 2, 2007

(65) Prior Publication Data

US 2008/0212040 A1    Sep. 4, 2008

(51) Int. Cl.
*G02B 27/46* (2006.01)
*G02B 26/06* (2006.01)
(Continued)

(52) U.S. Cl.
CPC ............. *G02B 27/46* (2013.01); *G02B 26/06* (2013.01); *G02B 27/48* (2013.01); *G03B 21/28* (2013.01); *G03B 33/06* (2013.01); *G03B 33/12* (2013.01); *G03H 1/02* (2013.01); *G03H 1/2294* (2013.01); *H04N 9/3111* (2013.01); *H04N 9/3161* (2013.01); *H04N 9/3164* (2013.01); *G03H 1/08* (2013.01); *G03H 1/2249* (2013.01); *G03H 2001/0224* (2013.01); *G03H 2001/0816* (2013.01); *G03H 2001/221* (2013.01); *G03H 2001/2218* (2013.01); *G03H 2001/2271* (2013.01); *G03H 2001/2297* (2013.01);
(Continued)

(58) Field of Classification Search
CPC ........ G02B 27/46; G02B 26/06; G02B 27/48; G03B 21/28; G03B 33/06; G03B 33/12; G03H 1/02; G03H 1/2249; G03H 2210/20; G03H 2001/2271; G03H 2001/2297; G03H 2225/24; G03H 2001/2218; G03H 2001/0816; G03H 2001/0224; G03H 1/08; G03H 2001/221; G03H 2227/02; H04N 9/3164; H04N 9/3161; H04N 9/3111
USPC .................. 353/98, 99, 30–31, 85, 121–122; 359/291, 238, 11, 22, 23, 32, 33, 449, 359/850, 223, 224, 9, 10, 290, 458, 566; 345/156; 250/239, 216, 234, 235, 226
See application file for complete search history.

(56) References Cited

U.S. PATENT DOCUMENTS 4,834,476 A    5/1989   Benton .................... 350/3.76
4,986,619 A    1/1991   Walker et al. ............ 350/3.61
(Continued)

OTHER PUBLICATIONS

Fienup, J.R., "Reconstruction of an object from the modulus of its Fourier transform," Optics Letters, vol. 3, No. 1, pp. 27-29, Jul. 1978.
(Continued)

*Primary Examiner* — Que T Le
*Assistant Examiner* — Jennifer Bennett
(74) *Attorney, Agent, or Firm* — John F. McCabe

(57) ABSTRACT

A method forms an image with a reconfigurable array of mirrors. The method includes configuring the array by translating some of the mirrors such that distances of the mirrors of the array from a reference plane have a non-uniform spatial distribution. The method includes illuminating the configured array with a coherent light beam such that part of the light beam is reflected off the array and is projected on a planar viewing screen.

7 Claims, 21 Drawing Sheets

(51) Int. Cl.
*G02B 27/48* (2006.01)
*G03B 33/06* (2006.01)
*G03B 21/28* (2006.01)
*G03B 33/12* (2006.01)
*G03H 1/02* (2006.01)
*H04N 9/31* (2006.01)
*G03H 1/22* (2006.01)
*G03H 1/08* (2006.01)

(52) U.S. Cl.
CPC ..... *G03H 2210/20* (2013.01); *G03H 2225/24* (2013.01); *G03H 2227/02* (2013.01)

(56) References Cited

U.S. PATENT DOCUMENTS

| | | | |
|---|---|---|---|
| 5,172,251 A | 12/1992 | Benton et al. | 359/9 |
| 5,700,076 A * | 12/1997 | Minich et al. | 353/31 |
| 5,808,802 A | 9/1998 | Hur | |
| 6,124,954 A | 9/2000 | Popovich et al. | |
| 6,211,848 B1 | 4/2001 | Plesniak et al. | 345/1 |
| 6,351,330 B2 * | 2/2002 | Ko et al. | 359/298 |
| 6,426,836 B2 | 7/2002 | Dorsel et al. | 359/443 |
| 6,577,429 B1 | 6/2003 | Kurtz et al. | 359/279 |
| 6,594,090 B2 | 7/2003 | Kruschwitz et al. | 359/707 |
| 6,600,590 B2 | 7/2003 | Roddy et al. | 359/287 |
| 6,625,381 B2 | 9/2003 | Roddy et al. | 385/147 |
| 6,791,739 B2 | 9/2004 | Ramanujan et al. | 359/279 |
| 6,870,985 B2 * | 3/2005 | Noonan | 385/17 |
| 6,876,484 B2 | 4/2005 | Greywall | 359/291 |
| 6,902,276 B2 | 6/2005 | Glenn | 353/98 |
| 6,984,917 B2 | 1/2006 | Greywall et al. | 310/310 |
| 7,099,063 B2 | 8/2006 | Greywall | 359/290 |
| 7,156,522 B2 * | 1/2007 | Plut | 353/31 |
| 7,158,279 B2 * | 1/2007 | Patel et al. | 359/290 |
| 7,161,608 B2 * | 1/2007 | Pettitt et al. | 345/690 |
| 7,458,691 B2 * | 12/2008 | Duncan | 353/94 |
| 7,492,948 B2 * | 2/2009 | Gluckstad | 382/211 |
| 2001/0019434 A1 * | 9/2001 | Popovich et al. | 359/15 |
| 2002/0001122 A1 | 1/2002 | Ko et al. | |
| 2003/0218794 A1 | 11/2003 | Takeda et al. | 359/292 |
| 2004/0263802 A1 | 12/2004 | Seki et al. | 353/99 |
| 2005/0013005 A1 | 1/2005 | Rogers | 359/630 |
| 2005/0219675 A1 | 10/2005 | Aksyuk | 359/224 |
| 2006/0066964 A1 | 3/2006 | Greywall | 359/849 |
| 2006/0126151 A1 | 6/2006 | Aksyuk | 359/291 |
| 2006/0267449 A1 | 11/2006 | Aksyuk | 310/309 |

OTHER PUBLICATIONS

Fienup, J.R., "Phase retrieval algorithms: a comparison," Applied Optics, vol. 21, No. 15, pp. 2758-2769, Aug. 1982.

Zalevsky, Z. et al., "Gerchberg-Saxton algorithm applied in the fractional Fourier or the Fresnel domain," Optics Letters, vol. 21, No. 12, pp. 842-844, Jun. 15, 1996.

Watson, G.P. et al., "Comparison of tilting and piston mirror elements for 65 nm mode spatial light modulator optical maskless lithography," J. Vac. Technol., vol. B 22, No. 6, pp. 3038-3042, Nov./Dec. 2004.

PCT International Search Report dated Jul. 17, 2008 (PCT/US2008/001803) 3 pages.

U.S. Appl. No. 11/713,483, filed Mar. 2, 2007, G. Chen, et al.
U.S. Appl. No. 11/713,207, filed Mar. 2, 2007, R. Giles, et al.
U.S. Appl. No. 11/681,376, filed Mar. 2, 2007, V. Aksyuk, et al.
U.S. Appl. No. 11/448,390, filed Jun. 6, 2006, G. Blumberg.

"PVPro Enabling personal video projectors", *Light Blue Optics Ltd.*, available online at: www.lightblueoptics.com, (2006) 5 pages.

R.W. Gerchberg and W.O. Saxton, "Phase Determination from Image and Diffraction Plane Pictures in the Electron Microscope", *OPTIK*, vol. 34, No. 3 (1971), pp. 275-284.

R.W. Gerchberg and W.O. Saxton, "A Practical Algorthm for the Determination of Phase from Image and Diffraction Plane Pictures" OPTIK, vol. 35, No. 2 (1972), pp. 237-246.

"A Tale of Two Cats", published on line at: http://www.ysbl.york.ac.uk/~cowtan/fourier/coeff.html, Dec. 15, 2006, 3 pages.

K. Greene, "Pocket Projectors" published on line at: http://www.technologyreview.com/BizTech/17860/, *Technology Review*, Dec. 6, 2006, 3 pages.

K. Greene, "Ultra-Colorful TV" published online at : http://www.technologyreview.com/read_article.aspx?id=17651&ch=infotech&sc=&pg=2, *Technology Review*, Oct. 24, 2006, pp. 1-4.

Lucente, Mark, "Diffraction—Specific Fringe Computation for Electro-Holography," Ph.D Thesis, Dept. of Electrical Enginnering and Computer Science, Massachusetts Institute of Technology, available online at http://www.media.mit.edu/spi/HVmark1.htm, Sep. 1994, abstract, table of contents, and pp. 13-174.

R.W. Gerchberg, "Super-resolution through error energy reduction", *OPTICA ACTA*, 1974, vol. 21, No. 9, pp. 709-720.

Patent Abstracts of Japan, Application No. 2002287047, published Oct. 3, 2002, 1 pg.

Patent Abstracts of Japan, Application No. 2005338154, published Dec. 8, 2005, 1 pg.

Japanese Patent Application No. 2002287047, Oct. 3, 2002, 17 pages.

Japanese Patent Application No. 2005338154, Dec. 8, 2005, 12 pages.

Patent Abstracts of Japan, Application No. 2004-325643, published Nov. 18, 2004, 2 pgs.

Japanese Patent Application No. 2004-325643, Nov. 18, 2004, 22 pgs.

* cited by examiner

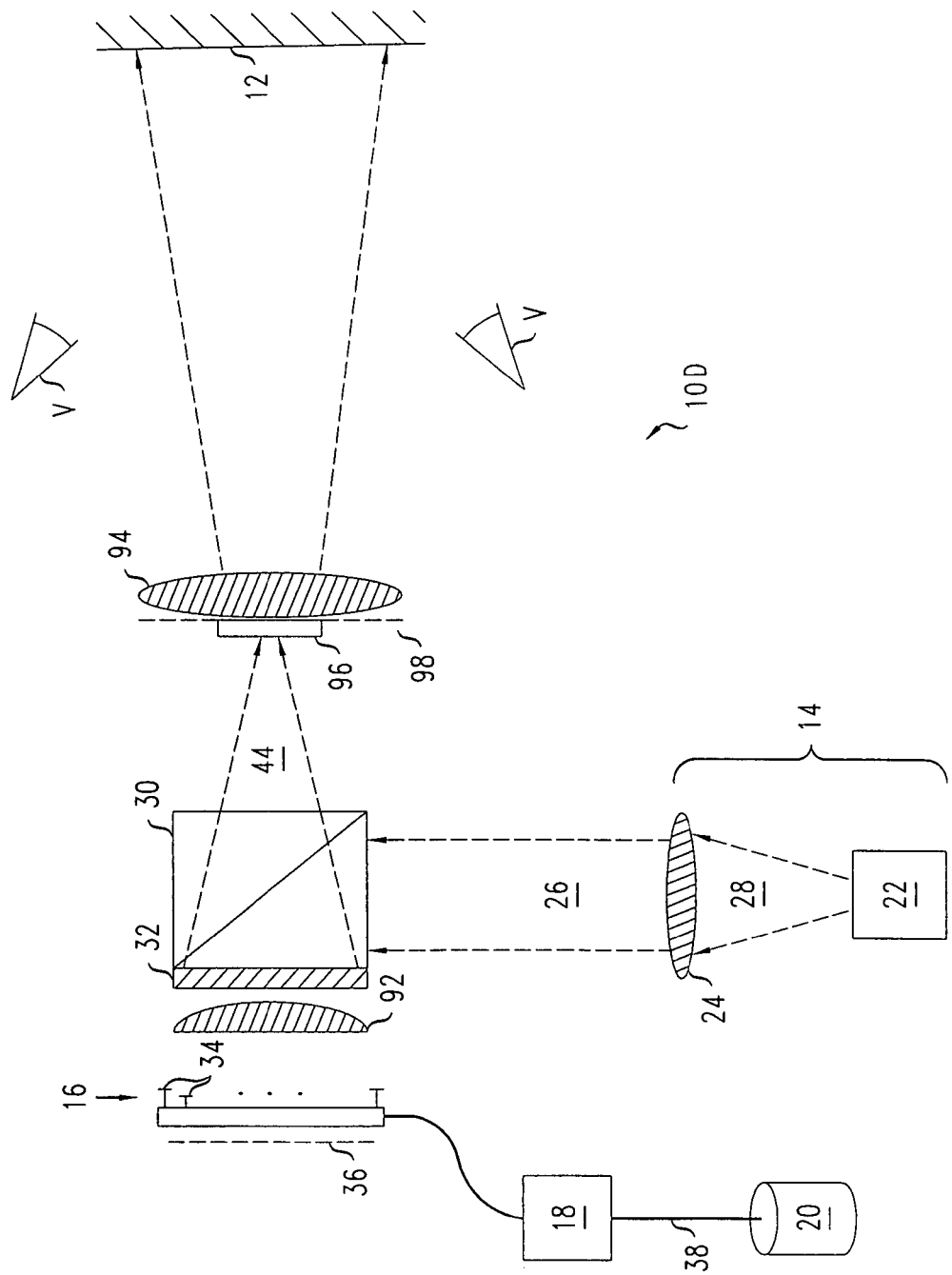

HOLOGRAPHIC MEMS OPERATED OPTICAL PROJECTORS

BACKGROUND

Technical Field

The invention relates to apparatus and methods for projecting light images on reflective viewing screens.

Discussion of the Related Art

This section introduces aspects that may be helpful to facilitating a better understanding of the inventions. Accordingly, the statements of this section are to be read in this light. The statements of this section are not to be understood as admissions about what is in the prior art or what is not in the prior art.

One type of image projector is based on a two-dimensional (2D) array of tiltable mirrors. The 2D array is illuminated by an incoherent light source. In the array, each mirror reflects part of the illumination light in a manner that depends on the mirror's orientation. The orientation of each mirror is controlled by a corresponding micro-electrical mechanical system (MEMS) actuator. The MEMS actuator tilts the corresponding mirror to reflect illumination light either towards a viewing screen or away from the viewing screen. That is, each MEMS actuator operates the corresponding mirror in an ON/OFF manner. The mirror is ON when it is tilted to specularly reflect a light spot to the viewing screen and is OFF when it is tilted to specularly reflect a light spot away from the viewing screen. Such tilting-mirror type image projectors can produce a variety of specularly reflected spot images.

BRIEF SUMMARY

Various embodiments provide image projectors that are based on coherent light sources. Rather than an image of mutually incoherent light spots, the new image projectors can form an image by substantially constructing a coherent light wavefront.

In one embodiment, an apparatus includes a light source and a reconfigurable array of mirrors and MEMS actuators. The light source includes a plurality of coherent sources. Each coherent source is configured to emit light of a different color than the remainder of the coherent sources. Each mirror is controlled by a corresponding one of the MEMS actuators that is able to translate the controlled mirror. The light source is configured to illuminate the mirrors with a time division color-multiplexed light beam.

In some specific embodiments, the apparatus is such that the light source is configured to vary the light beam between having a first color and having a second color at a frequency of greater than 20 Hertz. The apparatus may include a processor configured to operate the MEMS actuators such that the mirrors of the array have a first spatial distribution of translations when the light beam has the first color and have a different second spatial distribution of translations when the light beam has the second color.

In some specific embodiments, the apparatus includes a planar viewing screen and is configured to form an image on a viewing screen that a human would observe to be temporally constant and to have a superposition of the colors of the coherent sources. The viewing screen may non-specularly reflect light incident thereon.

In some specific embodiments, the apparatus includes a beam splitter located to redirect a light beam from the light source towards the reconfigurable array and a wave plate located between the beam splitter and the reconfigurable array.

In some specific embodiments of the apparatus, the diameters of the mirrors are less than 20 times a wavelength of light produced by the light source, and the apparatus includes a processor configured to operate the MEMS actuators such that the array forms a first image of a first color on a viewing screen and forms a second image of a second color on the viewing screen such that the first and second images have the same size.

In another embodiment, a method forms an image with a reconfigurable array of mirrors. The method includes configuring the array by translating some of the mirrors such that distances of the mirrors of the array from a reference plane have a non-uniform spatial distribution. The method includes illuminating the configured array with a coherent light beam such that part of the light beam is reflected off the array and is projected on a planar viewing screen. The illuminating may cause the viewing screen to non-specularly reflect part of the light projected thereon.

In some specific embodiments, the method includes then, reconfiguring the array by translating some of the mirrors such that distances of the mirrors of the array from the reference plane have a new non-uniform spatial distribution and re-illuminating the reconfigured array with a coherent light beam of a different color such part of the light beam of the different color is projected on the planar viewing screen. The method may further include during each of series consecutive of time periods, repeating the acts of configuring, illuminating, reconfiguring, and re-illuminating. Each of the periods may be less than $1/20$ seconds long.

In some embodiments of the method, the mirrors have largest diameters that are smaller than 20 times a wavelength of light of the light beam.

BRIEF DESCRIPTION OF THE DRAWINGS

FIG. 11A-11E are block diagrams of various alternate apparatus that modulate a coherent light beam to project an image on a viewing screen;

In the Figures and text, like reference numerals indicate elements with similar or the same functions and/or structures.

In the Figures, the relative dimensions of some features may be exaggerated to more clearly illustrate one or more structures or elements in the Figures.

In the various embodiments, the illustrated lens and lens systems may be, e.g., achromatic doublets.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

While an image projector based on an array of tilting mirrors can produce a large variety of light-spot images, such an image projector may not be efficient with illumination light. In particular, part of the illumination light is typically reflected by the mirrors away from the viewing screen and thus, is lost light. Rather than reflecting light away, some embodiments of image projectors described herein redistribute light on the viewing screen.

U.S. patent application Ser. No. 11/681,376, entitled "SPECKLE REDUCTION IN LASER-PROJECTOR IMAGES", by Vladimir A. Aksyuk, Randy C. Giles, Omar D. Lopez, and Roland Ryf; U.S. patent application Ser. No. 11/713,207, entitled "DIRECT OPTICAL IMAGE PROJECTORS" by Randy C. Giles, Omar D. Lopez, and Roland Ryf; and U.S. patent application Ser. No. 11/713,483, entitled "COLOR MIXING LIGHT SOURCE AND COLOR CONTROL DATA SYSTEM" by Gang Chen, Ronen Rapaport, and Michael Schabel are filed on the same date as the present patent application and are incorporated herein by reference in their entirety.

A) Reconstructive Formation of 2D Images

Figure 1:
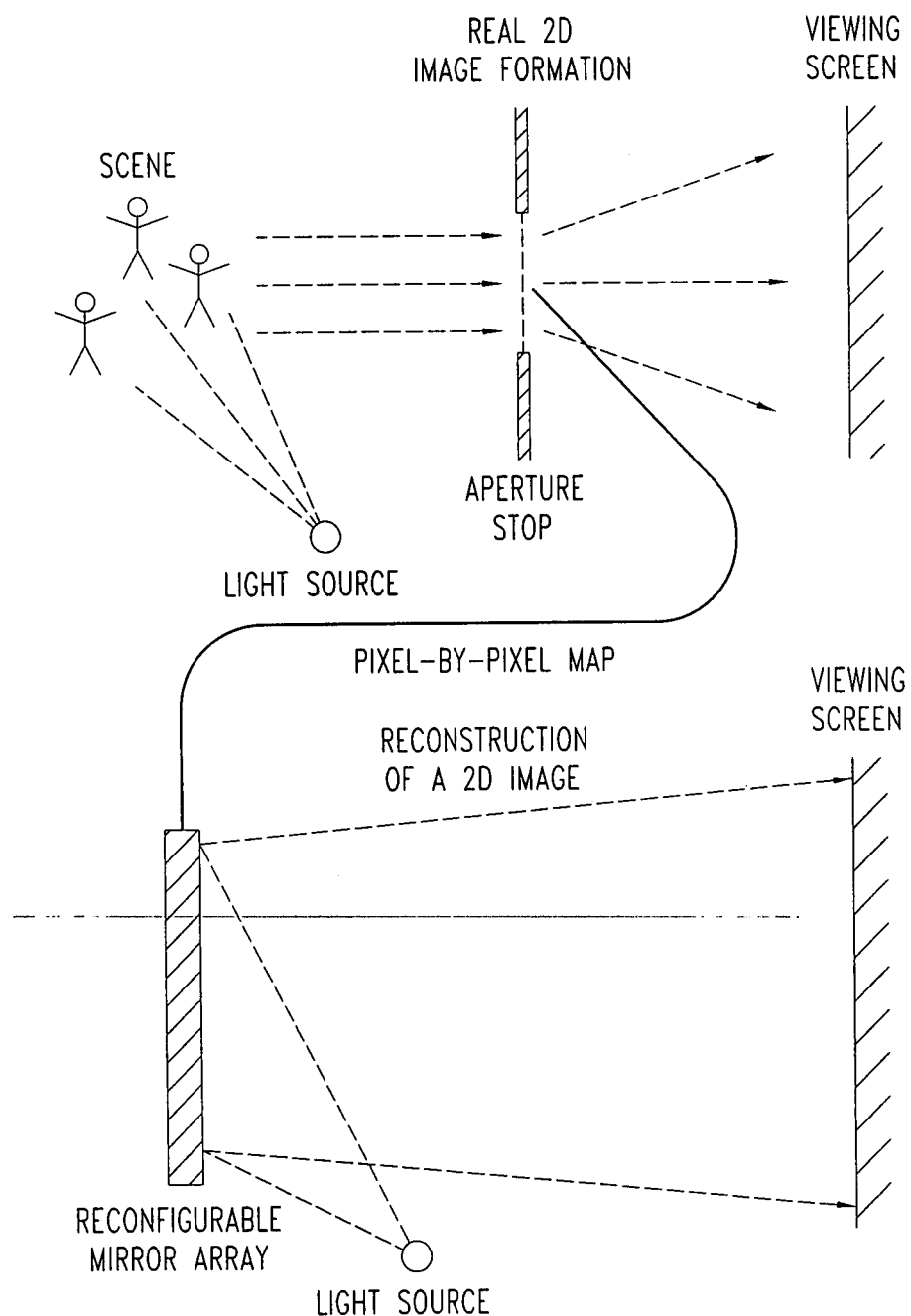
FIG. 1 schematically illustrates a ways of reconstructing two-dimensional (2D) image on a viewing screen.

FIG. 1 schematically illustrates a method for forming a two-dimensional (2D) coherent light image of a desired scene.

To form a real 2D image of the scene, coherent light source may be used as illumination light so that the scene scatters or transmits part of the illumination light thereby producing an outgoing light beam. Part of the outgoing light beam passes through a selected optical aperture and then, projects a 2D image on a planar viewing screen. Over the selected optical aperture, the outgoing coherent light beam forms a pattern of relative phases and amplitudes, which determines the 2D image that it will project onto the planar viewing screen.

Over the selected optical aperture, a map of the relative intensity and phase of the electric or magnetic field of the outgoing coherent light beam may be made in a pixel-by-pixel manner. The availability of such a pixel-by-pixel map over the selected optical aperture provides a basis for reconstructing the projected 2D image.

In particular, to reconstruct the 2D image, a light source can illuminate a reconfigurable array of micro-mirrors with coherent light. The micro-mirrors of the reconfigurable array are positioned to reflect the illumination light in a manner that produces an outgoing coherent light beam with approximately the same pixel-by-pixel map over the same selected optical aperture. That is, the reconfigurable array is configured to produce an outgoing coherent light beam with approximately the same pixel-by-pixel map of both relative phases and amplitudes over the selected optical aperture, e.g., a cross-section of the outgoing optical beam. If the reconstructed light beam has the same pixel-by-pixel map of the selected optical aperture as a coherent light beam actually scattered and/or transmitted by the desired scene, then, the reconstructed light beam will project the same image on the planar viewing screen.

Herein, a reconfigurable mirror array substantially only adjusts the phase of an incident light beam over its surface. Nevertheless, the produced spatial distribution of phases can to a good approximation fix the spatial distribution of both phase and amplitude over a cross section of the outgoing light beam, which is close to the reconfigurable mirror array and far from individual micro-mirrors therein. Thus, the reconfigurable mirror array is able to a good approximation to reconstruct an image as described above over such a cross section, i.e., the selected optical aperture. The pixel-by-pixel map may have individual micro-mirrors correspond to pixels or may have local disjoint groups of the micro-mirrors correspond to pixels. In the later case, the positions of the micro-mirrors of a group define the average relative amplitude and phase of the light on the corresponding pixel of the selected optical aperture.

B) Holographic Apparatus for Image Projection

Figure 2:
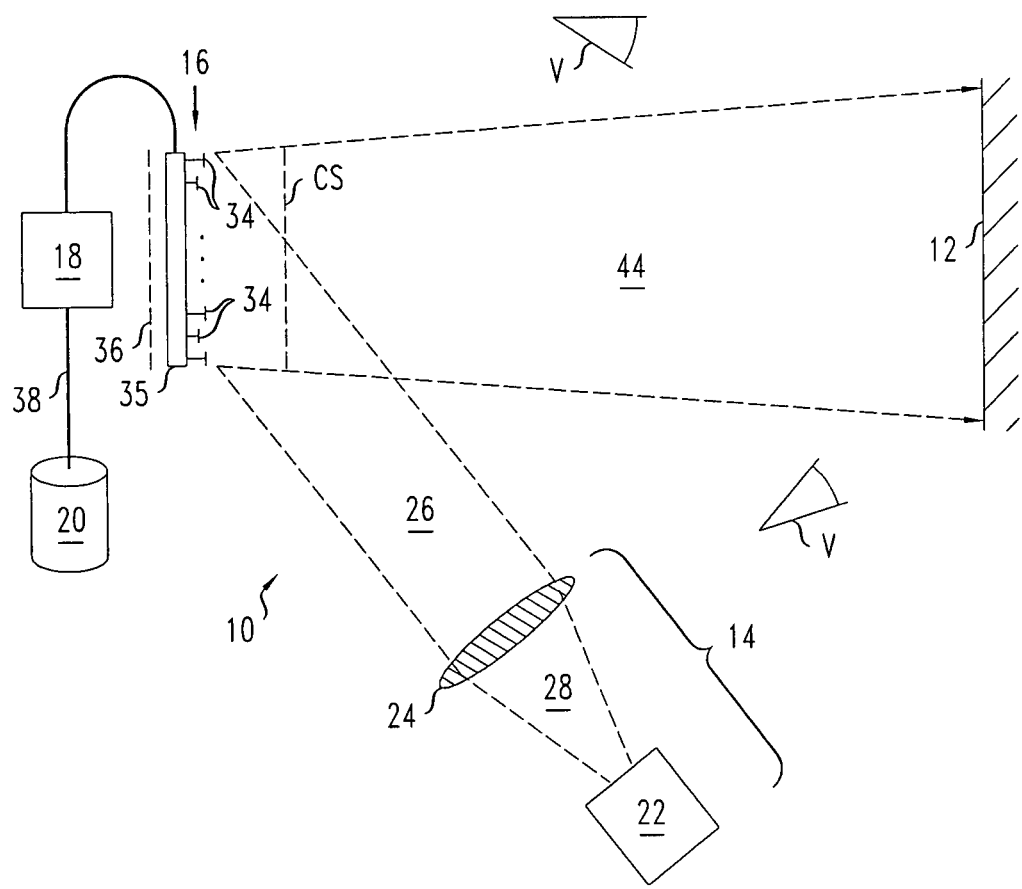
FIG. 2 is a block diagram of an apparatus that reflects a coherent light beam to project an image on a viewing screen, e.g., according to the method of FIG. 1.
Figure 3:
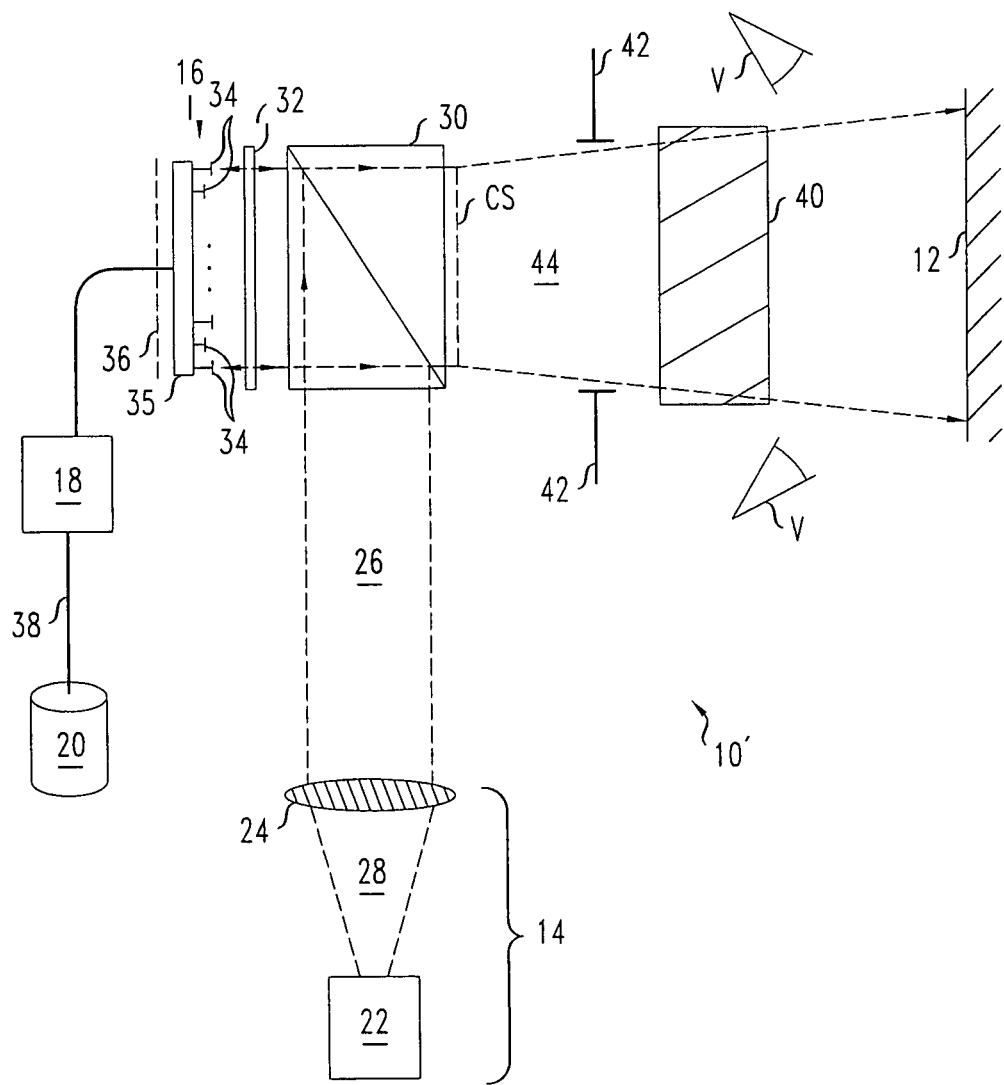
FIG. 3 is a block diagram of an apparatus that reflects a coherent light beam to produce a projected image, e.g., according to the method of FIG. 1.

FIGS. 2 and 3 illustrate exemplary apparatus 10, 10' for projecting images on a planar viewing screen 12 according to the method illustrated by FIG. 1. The apparatus 10 includes a coherent light source 14, a reconfigurable mirror array 16, a digital data processor 18, and a digital data storage device 20.

The planar viewing screen 12 may be, e.g., a substantially flat surface that non-specularly reflects or scatters back incident light, e.g., a conventional projection screen or a white wall. Due to the viewing screen's ability to non-specularly reflect or back scatter incident light, viewers, V, are able to see images projected on viewing screen 12 over a wide range of viewing directions.

The coherent light source 14 includes, e.g., a light source 22 and beam expansion optics 24. The light source 22 includes one or more conventional visible light semiconductor lasers. The light source 22 produces coherent light beam 28. The coherent light beam 28 may be, e.g., linearly polarized. The beam expansion optics 24 produces a wide laterally coherent light beam 26, e.g., a collimated light beam, from the light beam 28 output by the light source 22.

Examples of beam expansion optics 24 include refractive lenses, refractive lens systems, and non-planar reflective optical systems.

Part or the entire coherent light beam 26 is directed to illuminate the whole front reflective surface of the reconfigurable mirror array 16 in both apparatus 10, 10'. In the apparatus 10, the beam expansion optics 24 directs the wide light beam 26 directly towards the reconfigurable mirror array 16, i.e., at an oblique angle. In the apparatus 10', the beam expansion optics 24 directs the coherent light beam 26 to an optical beam redirector 30, which in turn redirects the coherent light beam 26 to be substantially normally incident on the reconfigurable mirror array 16. Optical beam redirector 30 may be, e.g., a polarization beam splitter that is oriented with respect to the polarization of the optical beam 26 so as to redirect light most or all light therein towards the reflective surface of the reconfigurable mirror array 16. In such embodiments, the apparatus 10' may also include a quarter wave plate 32 as shown in FIG. 3. The wave plate 32 is a birefringent plate whose produces a retardation of about ¼ of a wavelength between the two orthogonal linear polarization components of the optical beam transmitted normally there through. The wave plate 32 is located between such a polarization beam splitter 30 and the reconfigurable mirror array 16. The wave plate 32 has a thickness suitable to cause light that is reflected by the reconfigurable mirror array 16 to arrive at the polarization beam splitter 30 with an approximately appropriate linear polarization for transmission there through, i.e., instead being reflected back along the incident coherent light beam 26.

The reconfigurable mirror array 16 includes a regular or irregular 2D array of MEMS-actuated micro-mirrors 34, i.e., the micro-mirrors 34 have a substantially uniform spatially distributed along one surface of the reconfigurable mirror array 16. The micro-mirrors 34 may be substantially identical and may have a circular, rectangular, triangular, or square shape or may have a non-symmetric shape. Each micro-mirror 34 is physically connected to and controlled by a corresponding MEMS actuator, i.e., so that the reconfigurable mirror array 16 includes a 2D spatial array of micro-mirrors 34 and a corresponding 2D spatial array of MEMS actuators. The MEMS actuators are fabricated on a planar substrate 35, i.e., a silicon substrate. The MEMS actuators provide for the ability to independently control the micro-mirrors 34 such that each micro-mirror 34 can be translated normal to a reference plane 36, e.g., normal to a surface of the planar substrate 35 or normal to an average reflective surface of the reconfigurable mirror array 16.

Figure 4A:
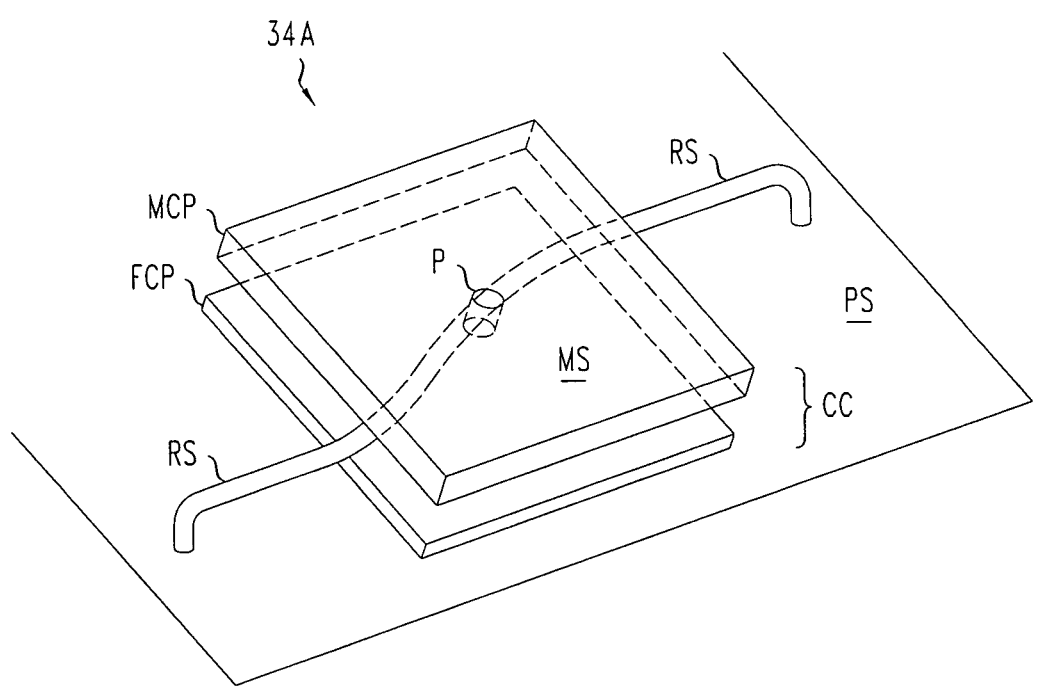
FIG. 4A is an oblique view of an exemplary microelectrical mechanical system (MEMS)-actuated micro-mirror that can be used, e.g., in the apparatus of FIGS. 2 and 3.

FIG. 4A illustrates one exemplary embodiment 34A for the MEMS-actuated micro-mirrors 34 of FIGS. 2-3. The micro-mirror 34A includes a control capacitor (CC), a restoring spring (RS), and a top planar mirror surface (MS) that forms the reflective surface, e.g., a silicon or metallic planar surface. The control capacitor CC includes a moveable conducting plate (MCP) and a fixed conducting plate (FCP), which is directly fixed to planar substrate (PS), e.g., the planar substrate 35 of FIGS. 2 and 3. The restoring spring RS rigidly fixes to the moveable conducting plate, MCP, via a post, P, and provides a translational restoring force that returns the mirror surface MS to its initial position when the control capacitor CC is discharged. The moveable conducting plate MCP translates the mirror surface MS in a piston like motion that may be, e.g., substantially perpendicular to the surface of the planar substrate PS so that the orientation of the mirror surface MS does not change during such motion. The piston-like translation movements of the mirror surface MS and the final rest positions thereof are controlled by voltages applied across the conducting plates MCP, FCP of the control capacitor CC.

Figure 4B:
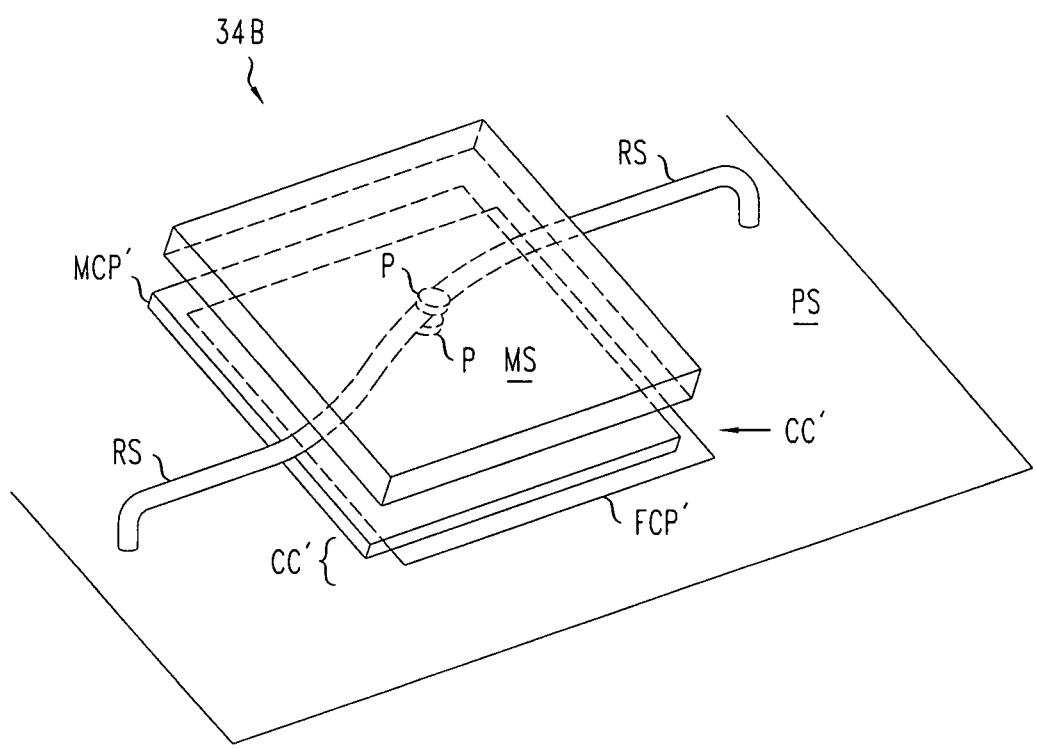
FIG. 4B is an oblique view of an alternate MEMS-actuated micro-mirror that can be used, e.g., in the apparatus of FIGS. 2 and 3.

FIG. 4B illustrates another embodiment 34B for the MEMS-actuated micro-mirrors 34 of FIGS. 2-3. The micro-mirror 34B includes a control capacitor (CC'), a restoring spring (RS), and a top planar mirror surface (MS), e.g., a silicon or metallic planar surface. The control capacitor CC' includes a moveable conducting plate, MCP', and a fixed conducting plate, FCP', i.e., fixed to planar substrate, PS, e.g., planar substrate 35 of FIGS. 2 and 3. The restoring spring RS rigidly fixes to the flat structure for the mirror surface MS via a post, P, and fixes to the underlying moveable conducting plate, MCP' via another post P. Thus, the restoring spring RS is located outside of the control capacitor CC' so that its presence and its position do not substantially effect the electro-static forces between the plates MCP' and FCP'. It may be desirable to have each restoring spring, RS, of the micro-mirrors located outside of the paired plates MCP' and FCP' to avoid interference with the electrical control of the control capacitors CC'. The restoring spring RS provides a translational restoring force that returns the mirror surface MS to its initial position when the control capacitor CC' is discharged. The moveable conducting plate MCP' translates the mirror surface MS in a piston motion substantially perpendicular to the surface of the planar substrate PS so that the orientation of the mirror surface MS does not change during such motion. The piston-like translation movements of the mirror surface MS and the final rest positions thereof are controlled by voltages applied across the conducting plates MCP', FCP' of the control capacitor CC'.

Other exemplary MEMS-actuated micro-mirrors and/or 2D arrays thereof may be described, e.g., in one or more of U.S. patent application Ser. No. 11/009,447 filed Dec. 10, 2004 by Vladimir A. Aksyuk et al, U.S. patent application Ser. No. 10/813,951 filed Mar. 31, 2004 by Vladimir A. Aksyuk et al, and U.S. patent application Ser. No. 11/140,313 filed May 27, 2005 by Vladimir A. Aksyuk et al. These U.S. Patent Applications are incorporated herein by reference in their entirety. The reconfigurable mirror array 16 of FIGS. 2 and 3 may include micro-mirrors and arrays thereof, which are fabricated or have features as described in one or more of the above-incorporated U.S. Patent Applications, provided that the individual micro-mirrors therein are capable of undergoing piston-like translations that do not change the angular orientations of the micro-mirrors.

The digital data processor 18 produces control signal sets for operating the MEMS-actuators that control the micro-mirrors 34 of the reconfigurable mirror array 16. That is, each MEMS actuator controls the normal distance of the corresponding micro-mirror 34 from the reference plane 36 in a manner responsive to a control signal set from the digital data processor 18. The digital data processor 18 produces one control signal set for each received pixel-by-pixel map of the phase and possibly amplitude of an electric or magnetic field for an outgoing coherent light beam 44 over a selected optical aperture. The selected optical aperture may be a flat surface just in front of the reconfigurable mirror array 16 or may be a cross section (CS) of the outgoing coherent beam 44 that is both located close to the reconfigurable mirror array 16 and at a distance large compared to maximum diameters of individual micro-mirrors 34. Typically, each different control signal set causes the MEMS actuators to set the distances of the micro-mirrors 34 from the reference plane 36 to have a different non-uniform spatial distribution. The digital data processor 18 typically outputs one control signal set for positioning the micro-mirrors 34 for each single-color image to be projected on the viewing screen 12. The control signal set and corresponding spatial distribution of micro-mirror positions for an image of a first color will often be different from the control signal set and corresponding spatial distribution of micro-mirror positions for an image of a second color even when the two images project the same shapes on the viewing screen due to diffraction as explained below.

The digital data storage device 20 may store image data sets that the digital data processor 18 uses to determine the control signal sets. The image data sets may include, e.g., pixel-by-pixel maps of relative phases over the selected aperture or pixel-by-pixel maps of both relative amplitudes and relative phases over the selected aperture. The data sets may also include control voltages for spatially positioning the micro-mirrors 34 so as to produce the outgoing light beam 44 with such a pixel-by-pixel map on the selected optical aperture from the coherent light beam 26. Thus, the reconfigurable mirror array 15 functions like a hologram that reconstructs a desired spatial phase distribution of outgoing light beam over a smooth laterally bounded surface that is located in front of the reconfigurable mirror array 16. The data sets are communicated to the digital data processor 18 via a communication line or bus 38.

The apparatus 10, 10' may also include optional optical elements 40, 42 for processing the outgoing coherent light beam 44 reflected off the reconfigurable mirror array 16. The optical element 40 is a refractive lens system that may adjust the divergence of the outgoing coherent light beam 44, i.e., providing magnification. The element 42 is an optical aperture stop, which may, e.g., filter out light that has been diffracted by the reconfigurable mirror array 16 into higher diffraction orders.

C) Magnification of Projected 2D Image

In the apparatus 10, 10' of FIGS. 2 and 3, the micro-mirrors 34 may have effective lateral linear dimensions that are small enough to cause substantial diffraction of incident light at a wavelength, λ, output from the light source 14. For example, the effective maximum diameters of the individual micro-mirrors 34 are typically larger than λ and smaller than one of 40λ, 20λ, 10λ, and 5λ. Herein, a maximum diameter of a micro-mirror is a diameter of the smallest circle into which the reflective surface of the micro-mirror will fit. Herein, an effective linear dimension, e.g., an effective maximum diameter, is the actual lateral linear dimension times any magnification that the lateral linear dimension would have when viewed through the output optics of the apparatus 10, 10', e.g., when viewed through the lens system 40 of FIG. 3.

Diffraction by the individual micro-mirrors 34 causes light that is redirected by the reconfigurable mirror array 16 to mix and interfere on the viewing screen 12. The lateral size of the image on the viewing screen 12 is determined by the diffraction produced by the individual micro-mirrors 34. In particular, such diffraction enables a desirably small reconfigurable mirror array 16 to produce a suitably large projected image on the viewing screen 12.

D) Method for Projecting Images on a Viewing Screen

Figure 5:
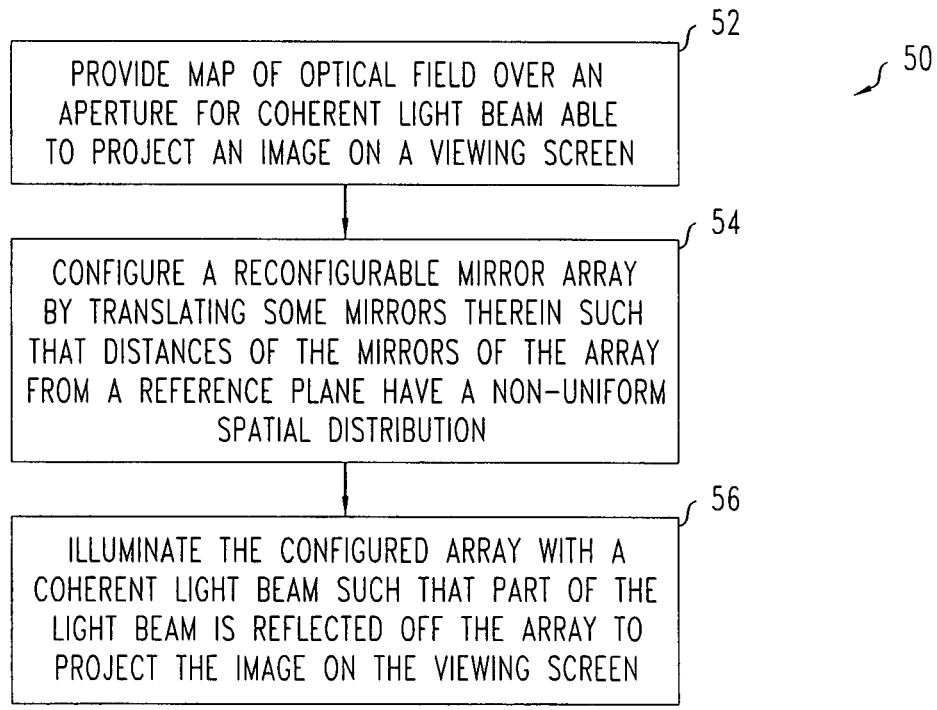
FIG. 5 is a flow chart illustrating a method of forming projected images of coherent light on a viewing screen, e.g., with the apparatus of FIG. 2 or 3.

FIG. 5 illustrates a method 50 for projecting 2D images on a planar or flat viewing screen, e.g., projected on the non-specularly reflecting viewing screen 12 with the holographic apparatus 10, 10' of FIGS. 2 and 3.

The method 50 involves approximately reconstructing the wave front of a coherent light beam that would be able to project a desired image on the viewing screen, e.g., the viewing screen 12 of FIGS. 2 and 3. For example, the coherent light beam with the wave front to be reconstructed may be a beam formed by scattering a coherent light beam by the desired scene and/or be a beam formed by transmitting a coherent light beam through the desired scene. In the method 50, the wave front will be reconstructed over a selected optical aperture through which the coherent light beam would have passed in traveling to the viewing screen. The selected optical aperture is a finite planar region whose form may vary in different embodiments. The selected optical aperture may the planar region formed by the average surface of the reconfigurable mirror array 16 of FIG. 2 or 3 or may be a cross section (CS) of the outgoing light beam 44 of FIG. 2 or 3 near the reconfigurable mirror array 16.

The method 50 includes providing a pixel-by-pixel map describing the optical field over the selected optical aperture for an actual coherent light beam capable of projecting the desired image on a viewing screen (step 52). The pixel-by-pixel map may provide relative phases of the electric or magnetic field of the coherent light beam over a set of pixels that covers the selected optical aperture, e.g., the pixels may correspond to the individual micro-mirrors 34 of the reconfigurable mirror array 34 of FIGS. 2 and 3. The pixel-by-pixel map may optionally provide relative amplitudes of the electric or magnetic field of the wave front over the same set of pixels. In that case each pixel may correspond to a disjoint local group of micro-mirrors 34, which is capable of approximately setting an average relative phase and relative amplitude on the pixel.

The pixel-by-pixel map is a list whose entries are in correspondence with the individual pixels of a pixel set that covers the selected aperture. In the list, each entry gives an average relative phase and optionally provides an average relative amplitude of the electric or magnetic field of the reflected light beam at the corresponding pixel. As a first example, the pixel-by-pixel map may provide the relative phase of the portion of the coherent optical beam 26 that is reflected by each micro-mirror 34 of the reconfigurable mirror array 16 of FIGS. 2 and 3. As a second example, the pixel-by-pixel map may provide the relative phase and relative amplitude of the portion of the coherent optical beam 26 that is reflected by each local disjoint group of micro-mirrors 34 in the reconfigurable mirror array 16 of FIGS. 2 and 3. The entire pixel-by-pixel map may be stored in a digital data storage device, e.g., the digital data storage device 20 of FIGS. 2 and 3, or may be evaluated, e.g., by the digital data processor 18, from data for the 2D image that are themselves stored in the same digital data storage device 20.

The method 50 includes configuring the reconfigurable mirror array by translating some of the mirrors therein such that distances of the mirrors of the reconfigurable mirror array from a reference plane have a non-uniform spatial distribution (step 54). The configuring involves positioning the micro-mirrors of the reconfigurable mirror array to reflect an incident coherent light beam in a manner that produces a reflected light beam with approximately the pixel-by-pixel map provided at step 52 over the selected aperture. The incident coherent light beam may be, e.g., the light beam 26 produced by the light source 14 of FIGS. 2 and 3. Then, the configuring step 54 varies, e.g., distances of some of the micro-mirrors 34 from the reference plane 36 that is parallel to the surface of the reconfigurable mirror array 16 of FIGS. 2 and 3.

The method 50 includes then, illuminating the reconfigurable mirror array as configures at the step 54 with a coherent light beam such that part of the light beam is reflected off the array to project the desired image on the viewing screen, e.g., the viewing screen 12 of FIGS. 2 and 3 (step 56). The illuminating coherent light beam may be typically spatially coherent over the height and width of the reconfigurable mirror array. Due to the positioning of the micro-mirrors at the step 54, the reflected part of the illumination coherent light beam will have at each pixel of the selected aperture about the phase of the pixel-by-pixel map provided at the step 52. For the example of the reconfigurable mirror array 16, the coherent light beam 26 would be reflected to produce the outgoing coherent light beam 44. Then, at each pixel of the selected optical aperture, the average relative phase of the electric or magnetic field of the outgoing coherent light beam 44 would be about that of the pixel-by-pixel map provided at the step 52. At each pixel, the phase and possibly amplitude of the outgoing coherent light beam would be approximately those of an actual coherent light beam that is capable of projecting the desired image on the viewing screen 12. In this example, the selected optical aperture may be the average surface of the reconfigurable mirror array 16 or a cross section, CS, of the outgoing coherent light beam 44 that is close to the reconfigurable mirror array 16 but much far there from compared to the size of the micro-mirrors 34 therein. For a desired image, there may be multiple configurations of the micro-mirrors 34 of the reconfigurable mirror array 34 that are able to approximately reconstruct such an outgoing light beam 44 that would projecting substantially the same desired image on the viewing screen 121.

In some embodiments of apparatus 10, 10' of FIGS. 2 and 3, performance of the step 56 of the method 50 includes causing small vibrations of the micro-mirrors 34 of the reconfigurable mirror array 14 at a frequency of greater than 30 Hertz. The small vibrations cause small fluctuations of local coherent light intensities on the viewing screen 12 and are controlled to temporally wash out of interference-induced light speckle in the projected image. The vibrations may be produced by vibrating the entire substrate 35 of FIGS. 2 and 3 or by vibrating individual micro-mirrors 34 through the MEMS actuators during the performance of the illumination step 56. The speckle in the projected image may be reduced, e.g., using by method(s) and/or system(s) described in the above-incorporated U.S. Patent Application entitled "SPECKLE REDUCTION IN LASER-PROJECTION IMAGES", by Vladimir A. Aksyuk, Randy C. Giles, Omar D. Lopez, and Roland Ryf.

The method 50 may include looping back to repeat the steps 52, 54, and 56 in response to a control signal indicating that another desired image is to be projected on the viewing screen, e.g., to produce a temporal sequence of 2D images on the viewing screen 12 of FIGS. 2 and 3. In some embodiments, the looping back may reconstruct new 2D images at a rate of at least twenty (20) frames per second and preferably at a rate of thirty (30) or more frames per second. That is, the repetition of frame rate may be high enough to produce the human viewers a perception of real smooth video.

E) Projecting Multi-Color Images

Some embodiments of the apparatus 10, 10' of FIGS. 2 and 3 may project images that a human viewer, V, would perceive as being multi-colored images on the viewing screen 12. One example of a suitable multicolor embodiment 14' of the light source 14 is illustrated in FIG. 6.

Figure 6:
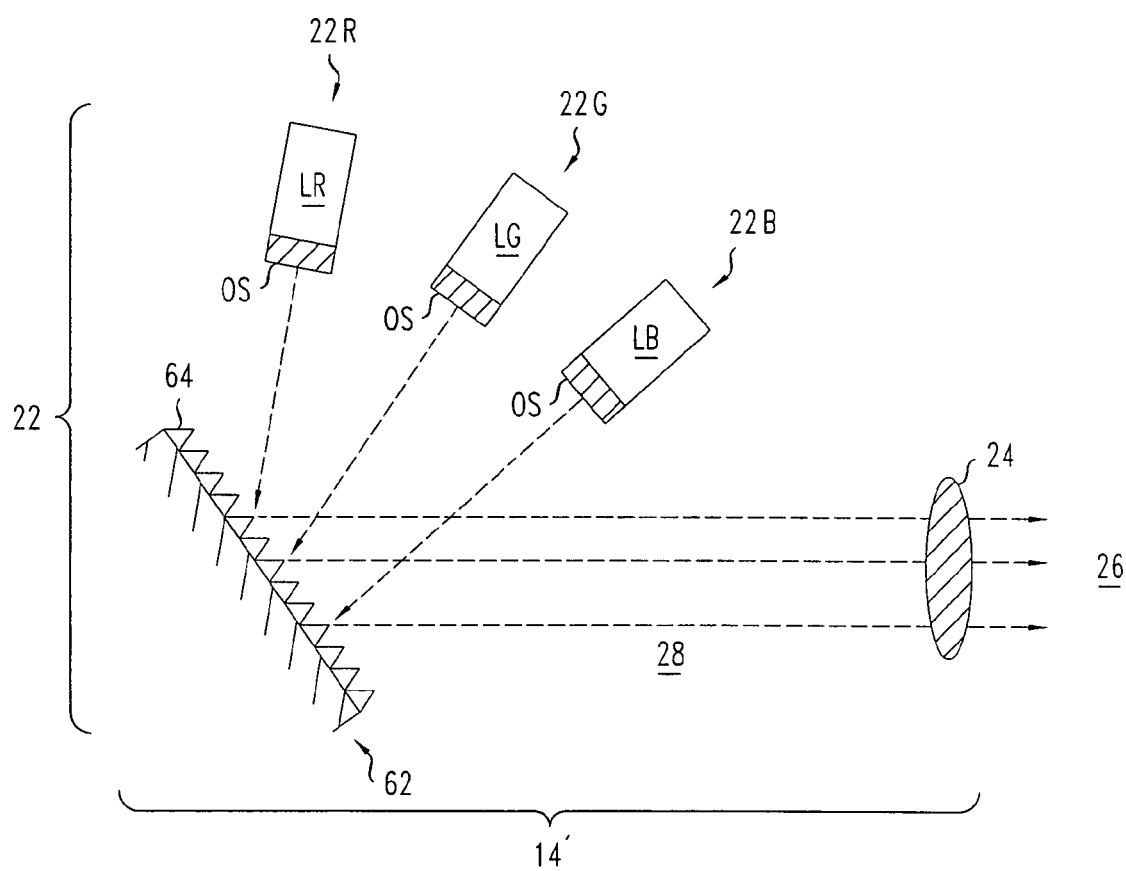
FIG. 6 is a block diagram illustrating a multi-color light source that may be used in some embodiments of the apparatus of FIGS. 2 and 3.

Referring to FIG. 6, the multi-color light source 14' includes, e.g., three coherent color light sources 22R, 22G, 22B and an optical wavelength multiplexer 62. Each of the three coherent light sources 22R, 22G, 22B includes a semiconductor laser LR, LG, LB this configured to output light of a different color, e.g., red, green, and blue. In some embodiments (not shown), one or more of the monochromatic semiconductor lasers LR, LG, LB may be replaced by multiple lasers of the same color, e.g., to reduce speckle on viewing screen 12. Each of the coherent light sources 22R, 22G, 22B also includes an optical switch OS that enables individual switching ON and OFF of the corresponding semiconductor laser LR, LG, LB. The optical wavelength multiplexer 62 redirects light from the three coherent light sources 22R, 22G, 22B to the expansion optics 24. The optical wavelength multiplexer 62 includes, e.g., a suitably oriented optical grating 64 as illustrated or another optical wavelength routing device (not shown).

The light source 14, as shown in FIGS. 2 and 3, may also include one or more semiconductor lasers and/or multi-color laser light sources as described in the above-incorporated U.S. Patent Application entitled "COLOR MIXTURE ILLUMINATION SOURCE AND COLOR CONTROL DATA SYSTEM" by Gang Chen, Ronen Rapaport, and Michael Schabel.

Even though the multi-color light source 14' provides the ability to project multi-colored images, the fact that each image requires modulation of the produced light beam 26 via the reconfigurable mirror array 16 presents a complication. In particular, the method for image formation uses the same reconfigurable mirror array 16 to modulate the light beam 26 for different colors of light. Such an arrangement may be complex to maintain when the image is, e.g., an object whose color is a mixture of the individual colors produced by different ones of the coherent light sources 22R, 22G, 22B as illustrated in FIG. 7.

Figure 7:
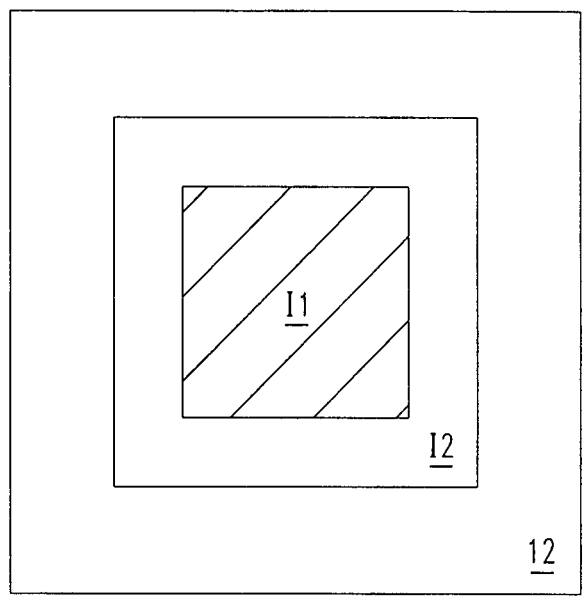
FIG. 7 illustrates a problem with using a single configuration of a mirror array to form multi-color projected images.

FIG. 7 schematically illustrates an attempt to project an image of a square on the viewing screen 12 of FIG. 2 or 3 with a single configuration the reconfigurable mirror array 16 when the square has a color that is a mixture of colors of two the semiconductor lasers LR, LG of FIG. 6. Since the reconfigurable mirror array 16 typically produces some diffraction in the outgoing coherent light beam 44, the single configuration of the reconfigurable mirror array 16 will typically project a first image I1 with the light from the semiconductor lasers LR and will project a different second image I2 with light from the other semiconductor laser LG. That is, the first and second images I1, I2 will not completely coincide on the viewing screen 12 due to the different amounts of diffraction produced on light of different colors. This non-coincidence problem can be resolved by combining time division color multiplexing with the use of spatial configurations of the reconfigurable mirror array 16 that depend on the color of the laser light being projected on the viewing screen 12.

Figure 8:
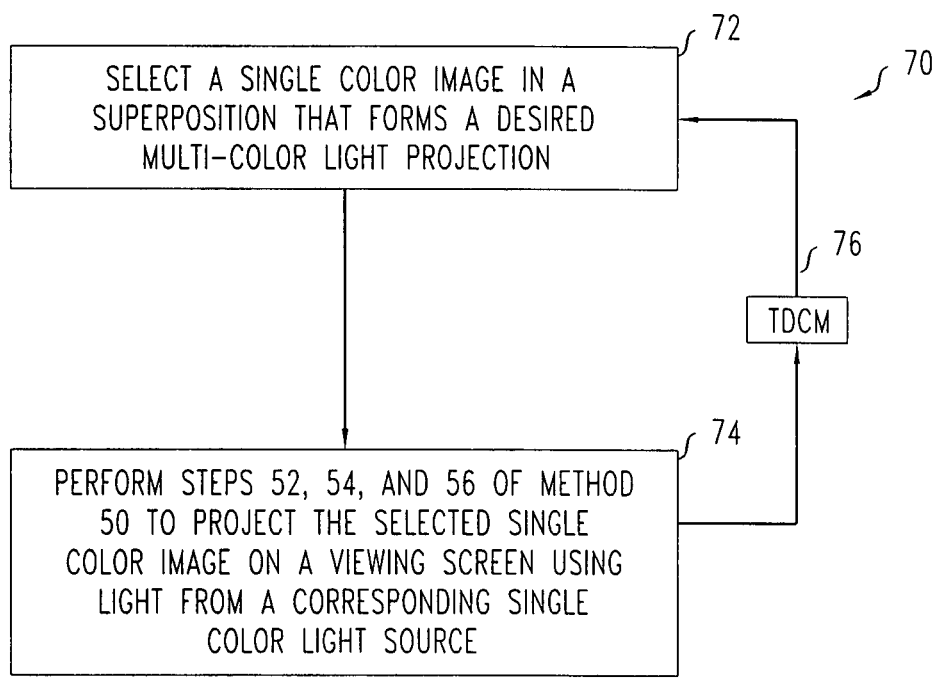
FIG. 8 is a flow chart illustrating a method of forming multi-color projected images of coherent light, e.g., using embodiments of the apparatus of FIG. 2 or 3.

FIG. 8 illustrates a method 70 for producing multi-color light projection, i.e., an image, on a viewing screen, e.g., the viewing screen 12 of FIG. 2 or 3. The method may use the apparatus 10, 10' of FIG. 2 or 3 with the multi-color light source 22' of FIG. 6. The multi-color light projection is a superposition of one or more images in the colors of single-color light sources, e.g., the single-color light sources 22R, 22G, 22B of FIG. 6.

The method 70 includes selecting a single color image in a superposition of such images that forms the desired multi-color light projection (step 72).

The method 70 includes performing steps 52, 54, and 56 of the method 50 to project the selected single color image on the viewing screen with light from the corresponding single color light source (74). The performing of step 52 includes providing a pixel-by-pixel map of a phase of the optical field for light of the selected single color over the selected optical aperture. In some embodiments, the providing pixel-by-pixel map will also provide the amplitude of the optical field for the light of the selected single color over the selected optical aperture.

The method 70 includes looping back (76) to repeat steps 72 and 74 for each remaining single color image in the superposition that gives the desired multi-color projection, i.e., to perform time division color multiplexing (TDCM). In each repetition of the steps 72 and 74, the provided pixel-by-pixel map provided at substep 52 of step 74 is based on the single color image to be projected at that repetition. In particular, the repetition would typically involve providing a new pixel-by-pixel map for each with a different single color image of the superposition. Such a repetition would also typically include reconfiguring the reconfigurable mirror array by translating some of the mirrors therein such that the distances of the mirrors of from the reference plane have a new non-uniform spatial distribution corresponding to the new pixel-by-pixel map. Finally, each repetition with a different single color image would typically include illuminating the reconfigured array with a coherent light beam of the different color such part of the coherent light beam of the different color is projected on the planar viewing screen.

The method 70 includes repeating steps 72, 74, and 76 at a frequency greater than the frequency needed for the human perception of smooth video (step 78). The repetition of the steps 72, 74, and 76 is needed to produce the perceived multi-colored projection based on time division multiplexing of single color images. In particular, each of the single color images of the superposition for the multi-colored projection would typically be projected for a time shorter than the inverse of the frequency for the human perception of smooth movement. Thus, a human viewer would perceive a single multi-colored image that averages the single color images rather than a sequence of single color images.

To produce such a "perceived" multi-color projection, the light source 14' would be controlled to perform time division color multiplexing at a high enough rate for the perception of a constant multi-colored image to a human viewer, V. In particular, the loop back or repeat frequency in the method 70 would be, at least, 20 Hertz and preferably would be 30 Hertz or more to give such a perception to a human viewer.

In some embodiments, the time division color multiplexing may be performed so that the single color images of different color are projected on the viewing screen for different lengths of time. Such unequal weighting of per-color projection times would then, vary the perceived intensities of the various single colors in the final superposition. Projecting a single color image for a larger part of the viewing time should cause a viewer to perceive that that color more strongly than would otherwise be the case.

F) Ways of Positioning Micro-Mirrors in Holographic Image Projector

Referring to FIGS. 2 and 3, there are various ways for fixing the positions of the micro-mirrors 34 such that the reconfigurable mirror array 16 produces from the incident coherent light beam 26 an outgoing coherent light beam 44 with a desired pixel-by-pixel map on the selected optical aperture. Some embodiments may fix the positions of the whole set of micro-mirrors 34 together to directly so that the light reflected by the reconfigurable mirror array 16 satisfies the map over the selected optical aperture. Other embodiments may separately determine the relative amplitude and relative phase of the light reflected by separate and disjoint local operating units in the reconfigurable mirror array 16. Each local operating unit includes, e.g., 2, 3, 4, or more neighboring micro-mirrors 34. In a local operating unit, an average distance of the micro-mirrors 34 from the reference plane 36 is adjusted so that light reflected by the local operating unit has an average relative phase satisfying the provided map at a corresponding pixel and differences between distances of the micro-mirrors 34 therein from the reference plane 36 are adjusted so that the average amplitude of light reflected by the local operating unit to the same pixel satisfies the provided map. This later approach to setting the configurations of groups of micro-mirrors is described for example in U.S. patent application Ser. No. 11/448,390, filed by Girsh Blumberg on Jun. 6, 2006 (Herein, referred to as the '390 application.). This U.S. Patent Application is incorporated herein by reference in its entirety. In each of the above approaches, configuring the reconfigurable mirror array 16 involves setting the distance of each micro-mirror 34 from the reference plane 36.

G) Evaluating a Pixel-by-Pixel Map of a Wave Front Over an Aperture

In methods 50 and 70 of FIGS. 5 and 8, several methods are available for producing pixel-by-pixel maps that enable configuring the micro-mirrors of a reconfigurable mirror array to modulate an incident coherent light beam in a manner that would project a desired image on the viewing screen. The processor 18 of FIG. 2 or 3 may perform, e.g., one of the methods to determine positions for the micro-mirrors 34 that would enable the reconfigurable mirror array 16 to project the desired image onto the viewing screen 12.

In the first and second methods, the light wavefront $g(m1, m2)$ just in front of the reconfigurable mirror array is a discrete inverse Fourier transform (IFT) of the image light wavefront $f(n1, n2)$ at the viewing screen. Here, the 2D vectors $(m1, m2)$ index the micro-mirrors (pixels) of the reconfigurable array of micro-mirrors, and the 2D vectors $(n1, n2)$ index the pixels on the viewing screen. For these methods, the image is treated as being in the far field region for the reconfigurable mirror array.

In a first and second methods, the processor 18 of FIGS. 2 and 3 performs iterative algorithms to generate suitable spatial pixel-by-pixel maps of the relative phase of incident coherent light reflected off each mirror of the reconfigurable mirror array. The produced pixel-by-pixel maps are pure phase modulations of the light wavefront incident on the reconfigurable mirror array. Such maps may be generated by versions of the Gerchberg-Saxton algorithm. Some versions of the Gerchberg-Saxton algorithm are described, e.g., in one or more of the articles published at Optics Letters, Vol. 21, No. 12 (Jun. 15, 1996) pages 842-844; Optics Letters, Vol. 3, No. 1 (July 1978) pages 27-29; Applied Optics, Vol. 21, No. 15 (Aug. 1, 1982) pages 2758-2769. These three articles are incorporated herein by reference in its entirety.

Figure 9:
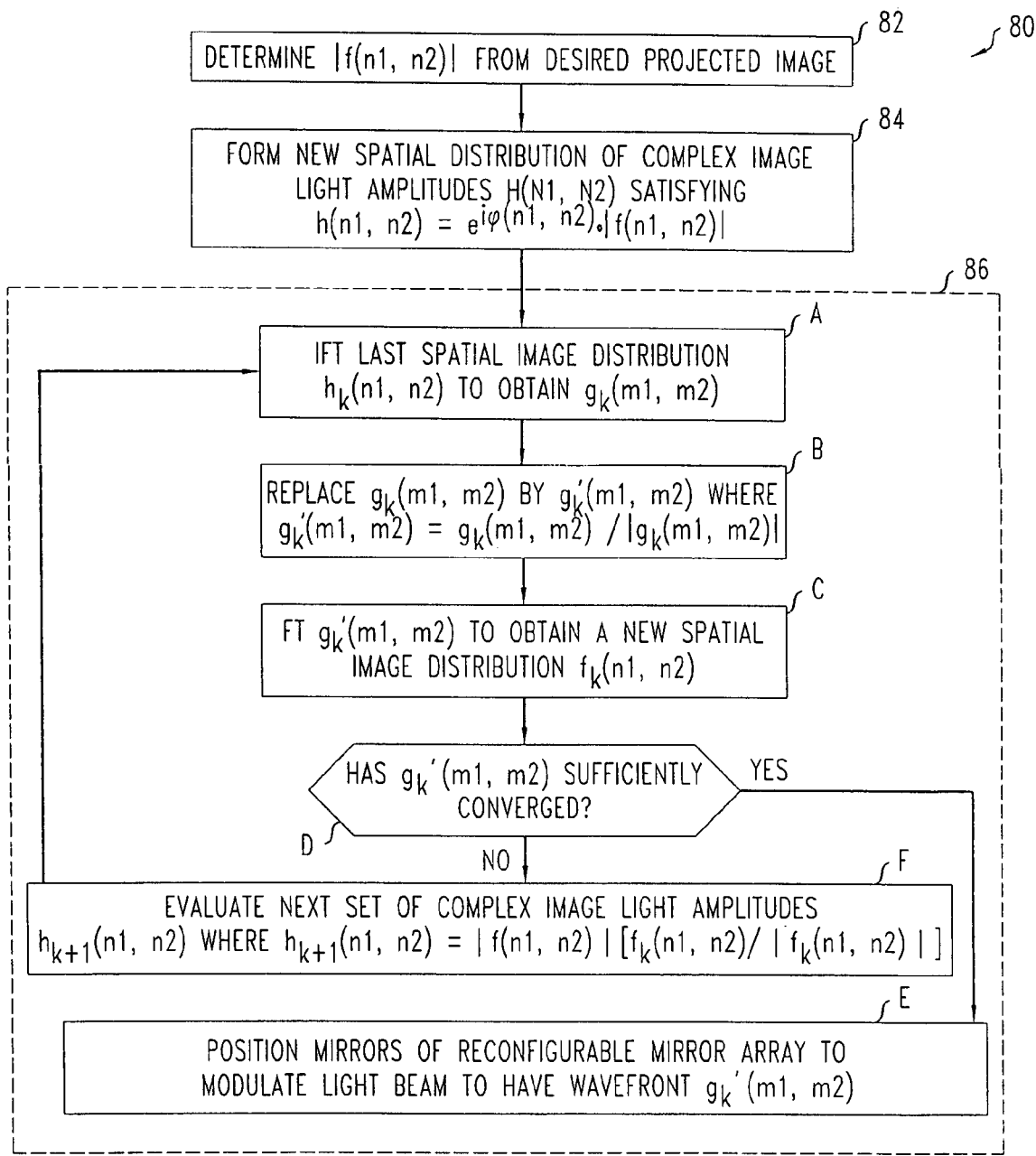
FIG. 9 is a flow chart illustrating a first iterative method of finding a configuration for a reconfigurable mirror array that would be suitable to phase-modulate an incident light beam so that the beam projects a desired image on a viewing screen, e.g., with the apparatus of FIG. 2 or 3.

FIG. 9 illustrates a first iterative method 80 for determining an appropriate pixel-by-pixel map, e.g., an appropriate $g(m1, m2)$ at the reconfigurable mirror array. The first iterative method 80 is based on the spatial distribution of monochromatic image light intensities, i.e., $f \cdot f^*(n1, n2)$, on the viewing screen.

The first iterative method 80 includes determining the spatial distribution of absolute light amplitudes at the viewing screen based on the desired image thereon, i.e., determining $|f(n1, n2)|$ (step 82). The absolute amplitudes are absolute values of the amplitude of the image light wavefront at the individual pixels, i.e., the $(n1, n2)$s, of the viewing screen.

Next, the first iterative method 80 includes forming a new spatial distribution of complex light amplitudes, i.e., $h(n1, n2)$, for the image by multiplying each of the absolute light amplitudes by a phase (step 84). If the multiplying phase at pixel (n1, n2) is given by $e^{i\Phi(n1,n2)}$, the new spatial distribution of complex light amplitudes is defined by:

$$h(n1,n2)=e^{i\Phi(n1,n2)}\cdot|f(n1,n2)|.$$

For any image, the phases may be selected in a variety of ways, because the perceived form of an image depends on the magnitudes of light amplitudes at the viewing screen and does not depend on the phases of the light amplitudes at the viewing screen. For example, the phases may be selected by any pseudo-random selection processes.

Next, the first iterative method 80 includes performing an iterative process to produce after N iterations a new discrete IFT function $g_N(m1, m2)$ that can produced by performing a pure phase modulation of an incident coherent light beam with the reconfigurable mirror array (step 86). For example, the apparatus 10' of FIG. 3 may produce a discrete IFT function $g_N(m1, m2)$ with a substantially constant magnitude over the micro-mirrors of the reconfigurable mirror array. The new $g_N(m1, m2)$ has a discrete FT $h_{N+1}(n1, n2)$ that gives the desired image on the viewing screen.

At the k-th cycle, the iterative process involves performing several substeps. First, the iterative process involves obtaining a discrete IFT, i.e., $g_k(m1, m2)$, of the last spatial distribution of complex image light amplitude, i.e., $h_k(n1, n2)$ (substep A). At the first iteration, the spatial distribution $h_1(n1, n2)$ is the spatial distribution $h(n1, n2)$ that was obtained at above step 84. Next, the iterative process includes replacing the discrete IFT $g_k(m1, m2)$ by a new spatial distribution of pure phases, i.e., $g_k'(m1, m2)$ (substep B). The distribution $g_k'(m1, m2)$ is given by:

$$g_k'(m1,m2)=g_k(m1,m2)/|g_k(m1,m2)|.$$

Next, the iterative process involves taking a discrete FT of the spatial distribution of pure phases $g_k'(m1, m2)$ to obtain a new spatial image distribution $f_k(n1, n2)$ on the viewing screen (substep C). Next, the iterative process involves determining whether the $g_k'(m1, m2)$ has sufficiently converged for projection of a suitable image on the viewing screen (substep D). Some embodiments may determine that sufficient convergence has occurred in response to performance of a preselected number of iterations, i.e., iterations of the loop formed by substeps A, B, C, D, and F. For example, the preselected number may be 5 iterations for low quality images, 10 iterations for a medium quality images, and 100 iterations for high quality images. Of course, the preselected numbers of iterations may vary for different embodiments. Alternate embodiments may involve evaluating an error, E, whose value is then, used to determine the number of iterations at which sufficient convergence occurs. In one such embodiment, the error E is a sum over the viewing screen pixels, i.e., (n1, n2), and is defined as:

$$E=\Sigma_{image\ pixels(n1,n2)}[|f(n1,n2)|^2-|FT\{g_k/|g_k|\}(n1,n2)|^2]^2.$$

In such embodiments, the iterative process is sufficiently converged when the discrete FT of the phase pattern on the reconfigurable mirror array provides an image that is sufficiently close to the desired image. In another embodiment, the above equation for the error E is modified by replacing $g_k/|g_k|$ by $g_k$ on the right-hand side thereof. Such a modification is available, because $g_k(m1, m2)$ typically converges to a distribution of pure phases after an adequate number of iterations. Alternately, the error E may be a sum over the pixels or micro-mirrors of the reconfigurable mirror array. One such error E is given by:

$$E=\Sigma_{(m1,m2)\ pixels\ of\ array}[|g_k(m1,m2)|^2-|g_k'(m1,m2)|^2]^2.$$

In such embodiments, the convergence is sufficient when the function $g_k(m1, m2)$ is sufficiently precisely represented by a spatial distribution of pure phases on the reconfigurable mirror array. If the iterative process is determined to have sufficiently converged at substep D, the iterative process then, includes vertical positioning the individual micro-mirrors of the reconfigurable mirror array in a manner that produces the $g_k'(m1, m2)$ phase modulation on a light beam incident on the reconfigurable mirror array (step E). That is, the micro-mirror at lateral (m1, m2) is positioned to produce a wavefront whose local phase is $g_k'(m1, m2)/|g_k'(m1, m2)|$ from the portion of the coherent light beam that will be incident on that micro-mirror. If the iterative process has not yet sufficiently converged, the iterative process includes evaluating the next spatial distribution of complex image light amplitudes, i.e., $h_{k+1}(n1, n2)$, at the viewing screen (substep F). The next spatial distribution $h_{k+1}(n1, n2)$ is defined as follows:

$$h_{k+1}(n1,n2)=|f(n1,n2)|[f_k(n1,n2)/|f_k(n1,n2)|].$$

Here, $f_k(n1, n2)$ is the discrete FT at the viewing screen of the spatial distribution $g_k'(m1, m2)$ on the reconfigurable mirror array. Thus, the phases and magnitudes of the next image light wavefront $h_{k+1}(n1, n2)$ are defined by the discrete FT of $g_k'(m1, m2)$ and the desired image, respectfully. After substep F, the iterative process includes repeating substeps A-D and E or F for the (k+1)-th iteration.

Figure 10:
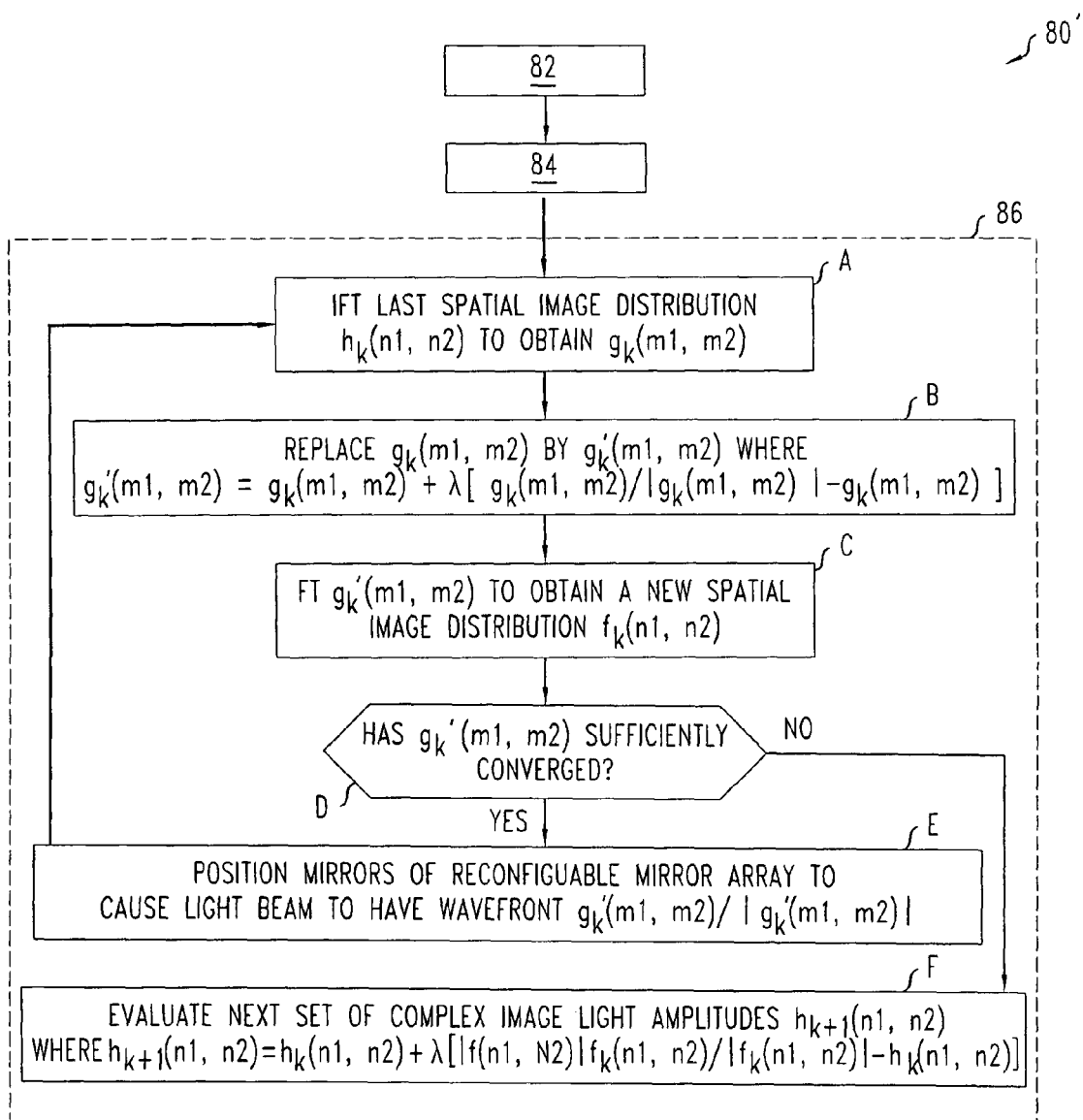
FIG. 10 is a flow chart illustrating a second iterative method of finding a configuration for a reconfigurable mirror array that would be suitable to phase-modulate an incident light beam so that the beam projects a desired image on a viewing screen, e.g., with the apparatus of FIG. 2 or 3.

FIG. 10 illustrates the second iterative method 80' for finding an appropriate pixel-by-pixel map, e.g., a g(m1, m2) at the reconfigurable mirror array 16 that would cause the projection of the desired image on the viewing screen 12. The second iterative method 80' is also based on the spatial distribution of monochromatic image light intensities, i.e., $f\cdot f^*(n1, n2)$, on the viewing screen.

The second iterative method 80' includes repeating steps 82, 84, and 86 as described with respect to the method 80 of FIG. 9, but some substeps of the step 86 are modified in the second iterative method 80', i.e., due to a new iterative process.

At the k-th cycle, the new iterative process involves performing already described substeps A-F as described for step 86 with the following modifications. At substep B, the iterative process involves replacing the discrete IFT $g_k(m1, m2)$ by a new spatial distribution $g_k'(m1, m2)$, which is given by:

$$g_k'(m1,m2)=g_k(m1,m2)+\lambda[g_k(m1,m2)/|g_k(m1,m2)|-g_k(m1,m2)].$$

Thus, the new spatial distribution has a memory of the magnitudes of the values in the discrete IFT. At substep F, the new iterative process includes defining the next distribution of complex light amplitudes over the viewing screen as follows:

$$h_{k+1}(n1,n2)=h_k(n1,n2)+\lambda[|f(n1,n2)|f_k(n1,n2)/|f_k(n1,n2)|-h_k(n1,n2)].$$

Thus, the new iterative process has a memory of the magnitudes of the values in the discrete FT. In the new iterative process, the real positive parameter $\lambda$ has, e.g., a small positive value, $\lambda \cong 1.5$. The selection of the $\lambda$ may affect the rapidity of the convergence of the iterative process.

In a third method, a pixel-by-pixel map of both the relative amplitude and the relative phase is obtained for a light beam capable of projecting the desired image on a viewing screen via two measurements. In the first measurement, the scene-to-be-imaged scatters or transmits a coherent light beam, and the intensity of the scattered or transmitted light is measured over a selected aperture. In the second measurement, a coherent light beam is again transmitted or scattered by the scene-to-be-imaged and is then, interfered with a known coherent reference beam. Then, the intensity of the interfered beams is measured over the selected aperture to obtain a pixel-by-pixel map of the phase of the transmitted or scattered light beam over the selected aperture. This method for obtaining a pixel-by-pixel map of both amplitude and phase information over a selected optical aperture is described for example in the above-mentioned '390 application.

Other techniques for finding a pixel-by-pixel map of relative phases and/or amplitudes over a selected optical aperture for a light beam that would project a desired image on a viewing screen may be described in one or more of "Diffraction-Specific Fringe Computation for Electro-Holography", Ph.D. Thesis of Mark Lucente in the Department of Electrical Engineering and Computer Science, Massachusetts Institute of Technology, September 1994; U.S. Pat. No. 6,211,848; U.S. Pat. No. 4,834,476; U.S. Pat. No. 4,986,619; and U.S. Pat. No. 5,172,251. The above-listed thesis U.S. Patents and U.S. Patent Application are incorporated herein by reference in their entirety.

H) Direct Image Projection with a Reconfigurable Mirror Array

FIGS. 11A-11E illustrate other apparatus 10A, 10B, 10C, 10D, 10E for projecting images, i.e., perceived as single colored or multi-colored, on viewing screen 12. The apparatus 10A-10E include 2D reconfigurable spatial light modulator 16, 16', coherent light source 14, digital data processor 18, digital data bus 38, and digital data storage device 20. Each of these elements of the apparatus 1A-10E may function, be inter-arranged and/or be constructed substantially similarly or the same as in same-numbered elements of the apparatus 10, 10' of FIGS. 2-3, i.e., except as distinguished below.

Figure 11A:
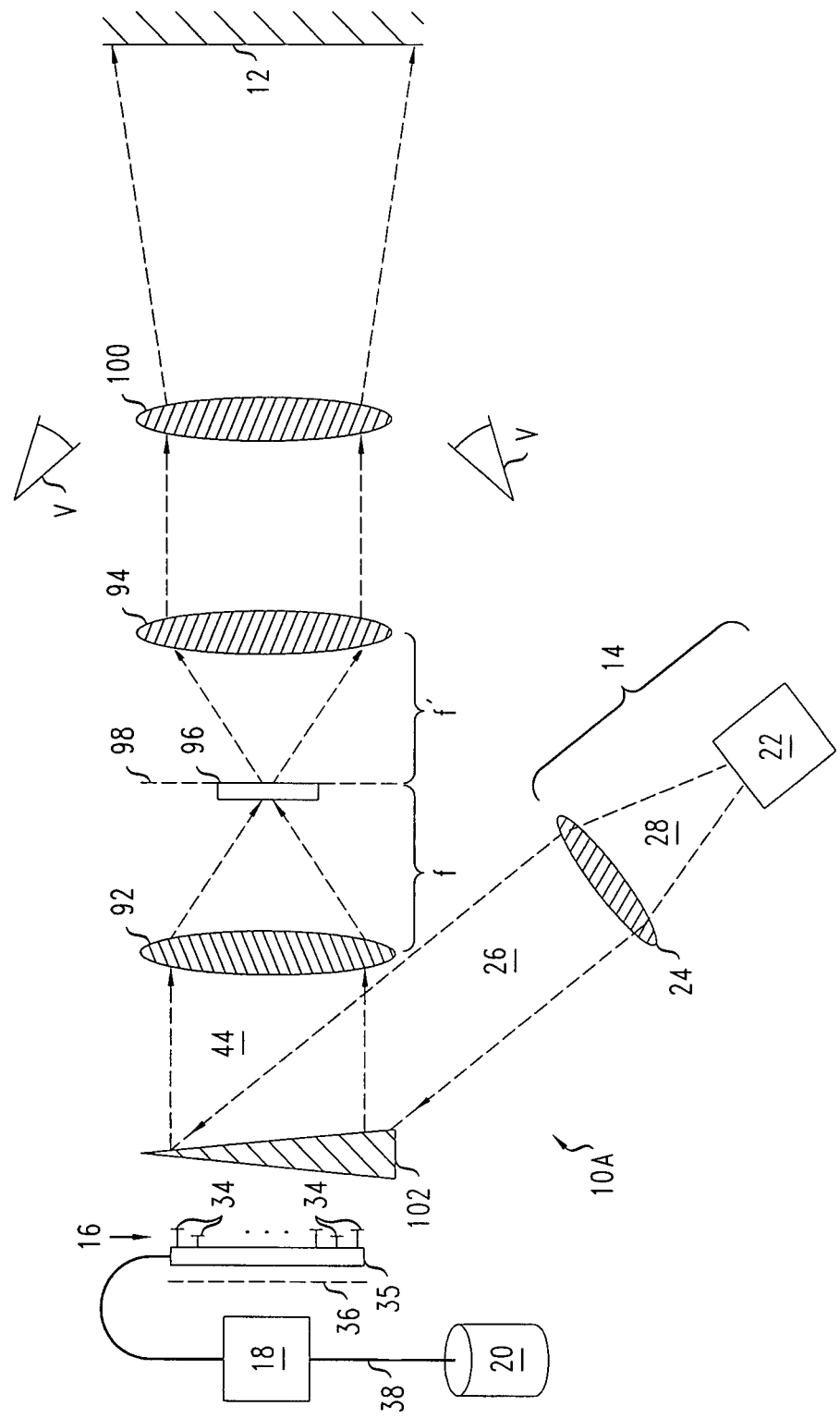
Figure 11B:
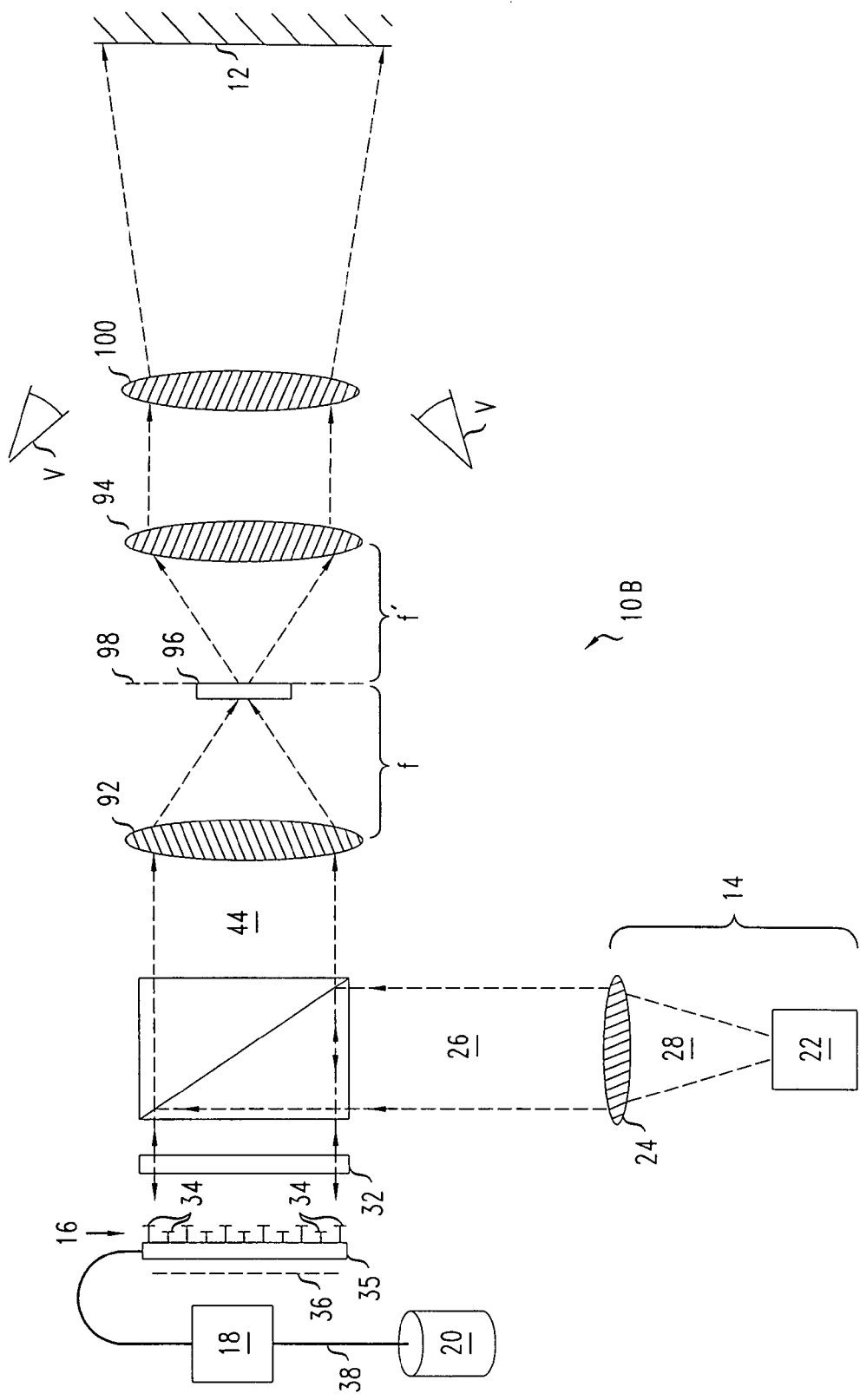
Figure 11C:
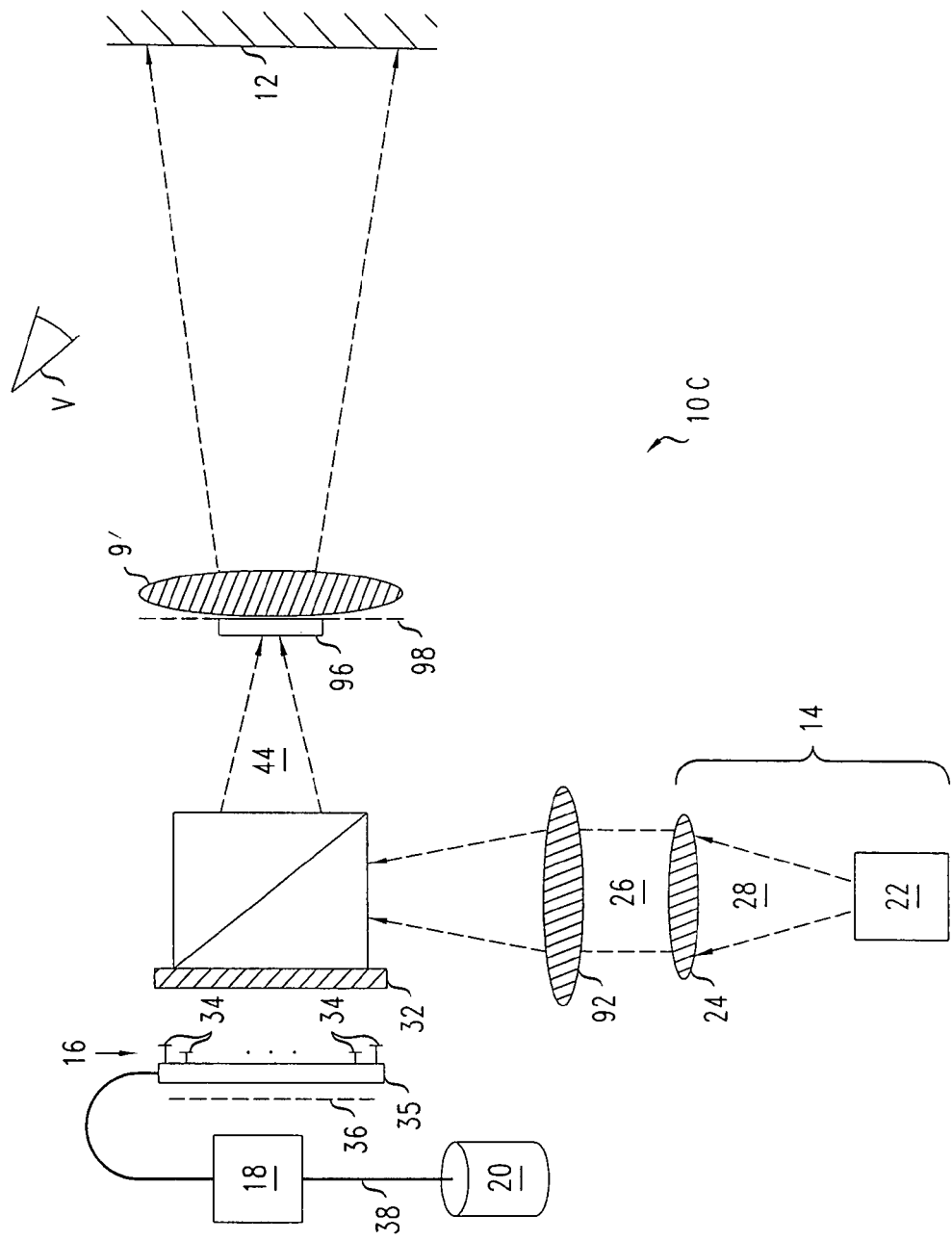
Figure 11E:
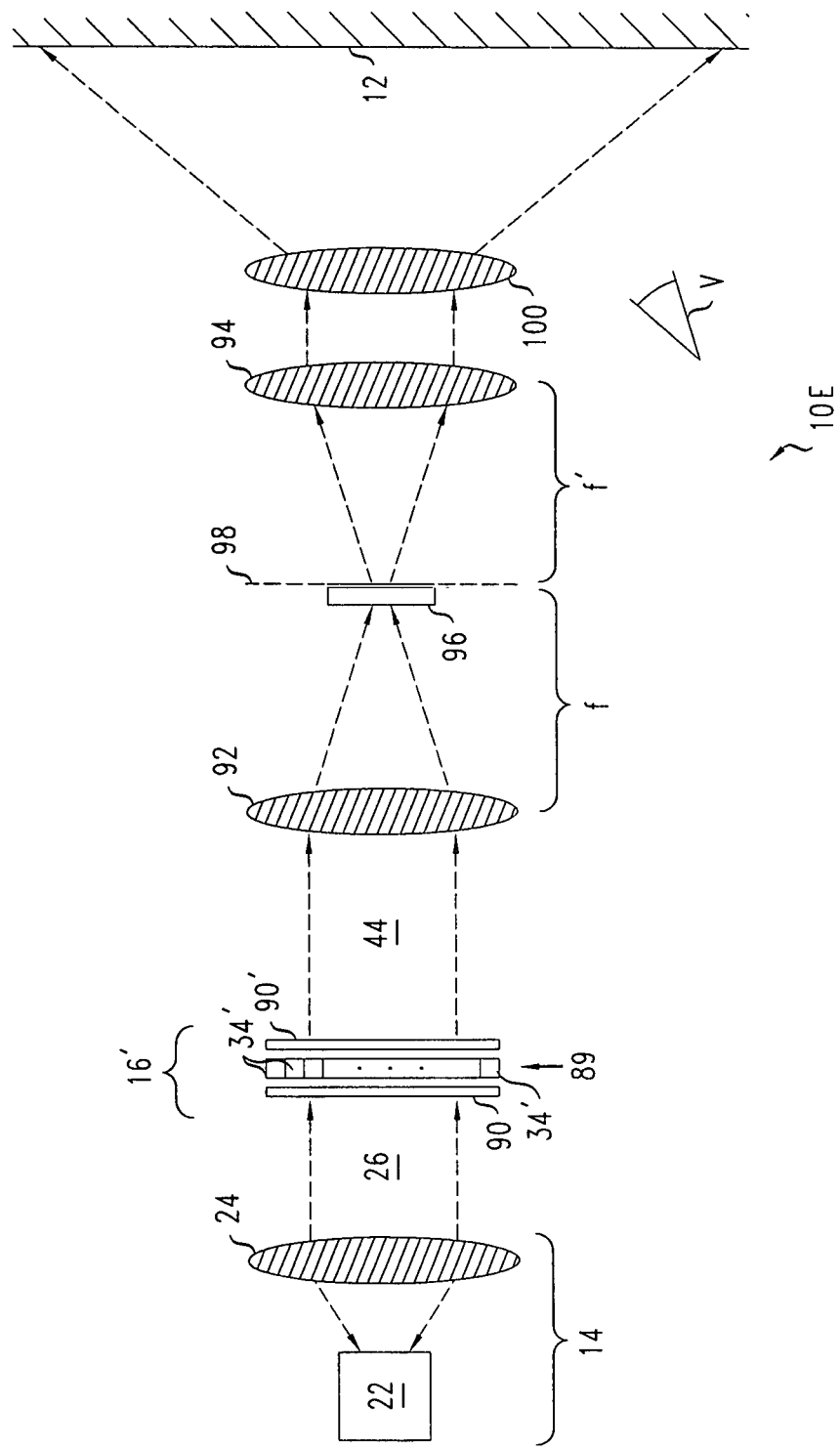

Herein, a reconfigurable spatial light modulator refers to either a 2D reconfigurable mirror array, e.g., the array 16 of micro-mirrors 34, as shown in FIGS. 11A-11D, or a 2D reconfigurable liquid crystal array, e.g., the array 16' of liquid crystal cells 34', as shown in FIG. 11E. A reconfigurable spatial light is able to modulator phase and/or amplitude modulate an incident coherent light wavefront in a spatially non-uniform and reconfigurable manner.

In FIGS. 11A-11D, the 2D reconfigurable mirror array 16 may have any construction already described with respect to the apparatus 10, 10' of FIGS. 2-3. That is, the reconfigurable mirror array 16 of the apparatus 10A-10D has, at least, some micro-mirrors 16 that perform piston-like motions under the control of MEMS actuators, e.g., motions perpendicular to the imaginary plane 36. The MEMS actuators are located in/on the planar substrate 35.

In FIG. 11E, the 2D reconfigurable liquid crystal array 16' includes a regular 2D array 89 of substantially identical liquid crystal cells 34' and a linear polarizer 90, 90' located on each side of the regular 2D array 89. Each liquid crystal cell 34' holds a birefringent liquid crystal and has electrodes adjacent on one or both surfaces thereof. The electrodes are configured to apply voltages that rotate the optical axis of the liquid crystal of the same liquid crystal cell 34'. The electrodes are controlled so that different liquid crystal cells 34' can be independently addressed. That is, the optical axes of different ones of the liquid crystal cells 34' can be independent rotated, under the control of the digital data processor 18. The linear polarizers 90, 90' may be configured to have their polarization directions in a variety of relative orientations, e.g., parallel or perpendicular. The sandwich of a liquid crystal cell 34' and polarizers 90, 90' may produce on an incident coherent light wavefront a phase modulation or a combination of phase and amplitude modulation. Thus, the reconfigurable liquid crystal array 16' can cause a controllable spatially non-uniform modulation of an incident light wavefront. The apparatus 10E modulates an incident illumination light beam 26 transmitted through the 2D reconfigurable liquid crystal array 16'. Other embodiments (not shown) may include a 2D reconfigurable liquid crystal array that modulates and incident light beam reflected from the reconfigurable liquid crystal array. Indeed, other embodiments image projection apparatus may setups similar to the apparatus 10A-10D of FIGS. 11A-11D except that the reconfigurable mirror array 16 is replaced by a reconfigurable reflective liquid crystal array.

In contrast to the apparatus 10, 10' of FIGS. 2-3, the apparatus 10A-10E of FIGS. 11A-11E use a direct one-to-one correspondence between the pixels of reconfigurable spatial light modulator 16, 16' and the pixels of the desired image. From the one-to-one correspondence, each pixel of the reconfigurable spatial light modulator 16, 16' in FIGS. 10A-10E may be configured based on the desired light intensity of the single corresponding pixel of the desired image. Thus, regions of the reconfigurable spatial light modulator 16, 16' are mapped directly into corresponding regions of the image to be projected onto the viewing screen 12. For that reason, the digital data processor 18 of many embodiments of the apparatus 10A-10E will not perform a complex iterative process over the entire reconfigurable mirror array 16 together to determine how to position an individual micro-mirror 34 or to configure an individual liquid crystal cell 34' so that the reconfigurable spatial light modulator 16, 16' projects a desired image. For example, the digital data processor 18 does not evaluate an inverse Fourier transform of the desired image in order for the apparatus 10A-10E to project the desired image on the viewing screen 12. For the above reasons, the digital data processor 18 of some embodiments of the apparatus 10A-10E may more rapidly determine positions of the micro-mirrors 16 or configurations of the liquid crystal cells 16' for a specific image than some embodiments of the apparatus 10, 10' of FIGS. 2-3.

The apparatus 10A-10E include additional functional elements that may not be present in embodiments of the apparatus 10, 10' of FIGS. 2-3. The additional elements include first focusing optical lens system 92, second focusing optical system 94, and optical transmission filter 96.

The first focusing lens system 92 is located on the portion of the optical path that is either after the reconfigurable spatial light modulator 16, 16', i.e., as in the apparatus 10A-10B and 10E, before the reconfigurable spatial light modulator 16, 16', i.e., as in the apparatus 10C, or both before and after the reconfigurable spatial light modulator 16, 16', as in the apparatus 10D. In various applications, the first focusing lens system 92 may be located in different ones of the above-listed positions to satisfy space/geometry constraints, e.g., constraints for integrating the one of the image projection apparatus 10A-10E into a small cell phone.

The transmission filter 96 is located at or near a plane 98 in which the first focusing filter 92 forms an image of the illumination light beam 26 incident onto the reconfigurable spatial light modulator 16, 16'. For example, if the illumination light beam 26 is substantially collimated, e.g., as shown in FIGS. 11A-11B and 11E, the plane 98 is at or near the focal plane of the first focusing lens system 92. In contrast, if the illumination light beam 26 is converging, e.g., as illustrated in FIGS. 11C and 11D, the plane 98 is located closer to the first focusing lens system 92 than the focal length. In the plane 98, the first focusing lens system 92 forms, e.g., a Fourier transform of the phase-modulated wavefront outgoing from the reconfigurable spatial light modulator 16, 16'.

Figure 12A:
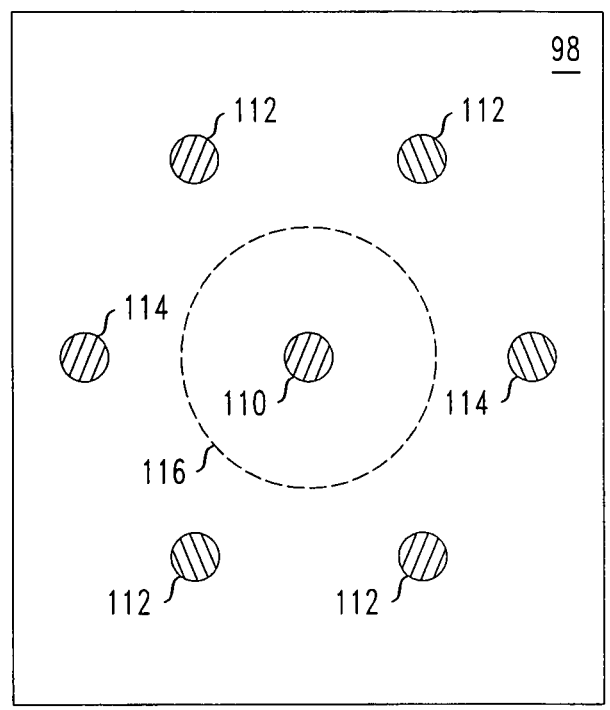
FIG. 12A-12B illustrate exemplary types of spatial filtering that can be performed in the Fourier plane of a first lens system in the image projection apparatus shown in FIGS. 11A-11E.
Figure 12B:
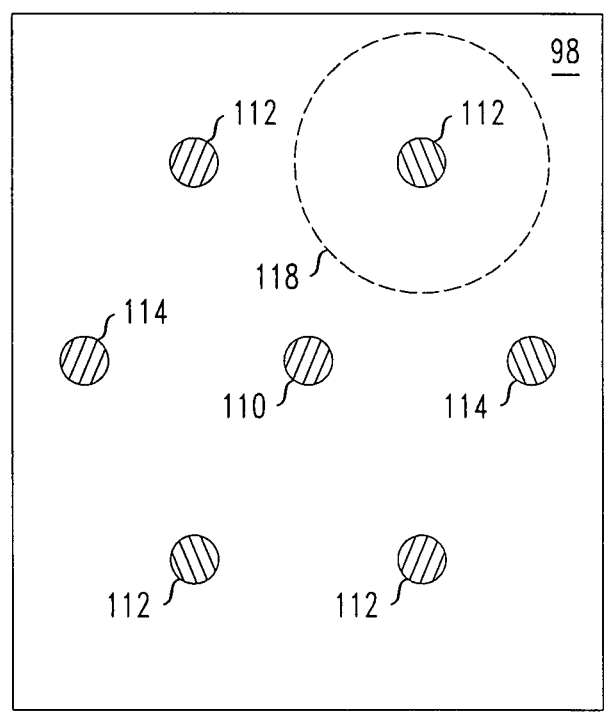

At the plane 98, the first focusing lens system 92 causes the outgoing light beam 44 to form a light pattern, e.g., as illustrated in FIGS. 12A-12B. The light pattern has bright spots 110, 112, 114 that group into different diffractive orders, e.g., due to the approximate 2D periodicity of the lateral distribution of micro-mirrors 34 or liquid crystal cells 34' in the reconfigurable spatial light modulator 16, 16'. The transmission filter 96 transmits to the rest of the image projection apparatus 10A-10E light from substantially only one of the bright spots 110, 112, 114 or from one diffractive order in the pattern of bright spots 110, 112, 114. The transmission filter 96 substantially blocks light from the other bright spots 110, 112, 114 of the light pattern on or near the plane 98. The light from the single unblocked bright spot 110, 112, 114 or unblocked diffractive order passes through the remaining lens system(s) 94, 100 to form the image on the viewing screen 12.

The transmission filter 96 provides an attenuation that varies with the lateral position on the plane 98. The attenuation may vary smoothly with position, R, on the plane 98. For example, the attenuation may depend on the position, R, as $A \cdot \exp[-([R-R_o]/w)^2/2]$ where $R_o$ and $2w$ are the respective center and width of the transmission filter 96. At places where $|R-R_o|=2w$, the transmission filter 96 attenuates incident light intensities by $e^{-2}$ more than it attenuates the incident light intensity at its center.

FIGS. 12A and 12B illustrate how $|R-R_o|=2w$ boundaries of the above-described exemplary transmission filter 96 might be located in the plane 98. These boundaries are indicated by dashed circles 116, 118 in FIGS. 12A-12B. In the example of FIG. 12A, the center of the transmission filter 96 is at the center of the bright spot 110, i.e., the zeroth diffractive order bright spot. In this embodiment, the transmission filter 96 substantially blocks the light from the other bright spots 112, 114 of the other diffractive orders. In the example of FIG. 12B, the center of the transmission filter 96 is at the center of one of the bright spots 112 of the first diffractive order. In this embodiment, the transmission filter 96 substantially blocks light from the other diffractive orders and from other bright spots 112 of the first diffractive order. The transmission filter 96 could also be configured to substantially transmit all of the bright spots 112 of the first diffractive order.

The second focusing lens system 94 is located on the portion of the optical path behind the transmission filter 96. In particular, the transmission filter 96 may be located in the focal plane of the second focusing lens system 94, i.e., as illustrated in FIGS. 11A-11B and 11E, or may be located much closer than the focal length f' from the second focusing system 94, as illustrated in FIGS. 11C-11D. The second focusing lens system 94 produces a Fourier transform or an inverse Fourier transform of the light wavefront transmitted by the transmission filter 96 at a late plane, e.g., at the viewing plane 12.

By serially interleaving the Fourier transforms performed by the focusing lens systems 92, 94 with the spatial filtering performed by the transmission filter 96, direct imaging of individual pixels of the reconfigurable spatial light modulator 16, 16' to individual pixels of the viewing screen seems substantially possible. The combined imaging process also enables the phase-modulated wavefront at the reconfigurable spatial light modulator 16, 16' to be converted into a visible wavefront on the viewing screen 12.

Some embodiments of the apparatus 10A-10E may include a lens system 100, e.g., as shown in FIGS. 11A-11B and 11E. The lens system 100 magnifies the lateral dimensions in the image being projected onto the diffusively reflective surface of the viewing screen 12.

Some embodiments of the apparatus 10A-10E project images, which are perceived as being multi-colored. In such embodiments, the coherent light source 14 may be the time-interleaved multi-color laser light source 14' of FIG. 6. In such embodiments, the reconfigurable spatial light modulator 16, 16' may be reconfigured at the color-interleaving rate to project different images for each interleaved color.

The micro-mirrors 34 and liquid crystal cells 34' of the apparatus 10A-10E may be operated individually or may be operated in local operating groups (LOGs). In the later case, a disjoint set of two, three or more neighboring micro-mirrors 34 or liquid crystal cells 34', as appropriate, forms each local operating group. Each operating group functions as a single pixel of the reconfigurable spatial light modulator 16, 16'. In some such embodiments, a proper subset of the micro-mirrors 34 or liquid crystal cells 34' of each local operating group are immobile and without a corresponding MEMS actuator or voltage controller.

The apparatus 10A of FIG. 11A may also include a glass wedge 102 that is configured to increase the incidence angle of the illumination light beam 26 on the reconfigurable mirror array 16. In some multi-colored embodiments, the coherent light source 14 may direct the different colors of the illumination light beam 26 onto the glass wedge 102 and/or reconfigurable mirror array 16 at somewhat different incidence angles so that images of different colors are projected onto the same lateral part of the viewing screen 12. In particular, such color-dependent incidence angle variations are typically needed when a nonzero diffractive order is selectively transmitted by the transmission filter 96. The apparatus 10 of FIG. 2 may also include a glass wedge (not shown) similar to and similarly configured to the glass wedge 102 of FIG. 11A.

In the various embodiments of the apparatus 10A-10E, the digital data processor 18, data bus 38, and digital data storage 20 control MEMS actuators that are located in or on the planar substrate 35 or control electrodes on the liquid crystal cells 34'. MEMS actuators control and adjust positions of some or all of the micro-mirrors 34 as described with respect to the apparatus 10, 10' of FIGS. 2-3. Nevertheless, to project the same desired image, the digital data processor 18, data bus 38, and digital data storage 20 of the apparatus 10A-10D may set up a different spatial configuration for the micro-mirrors 34 than would otherwise be set up for the apparatus 10, 10' of FIGS. 2-3.

Figure 13:
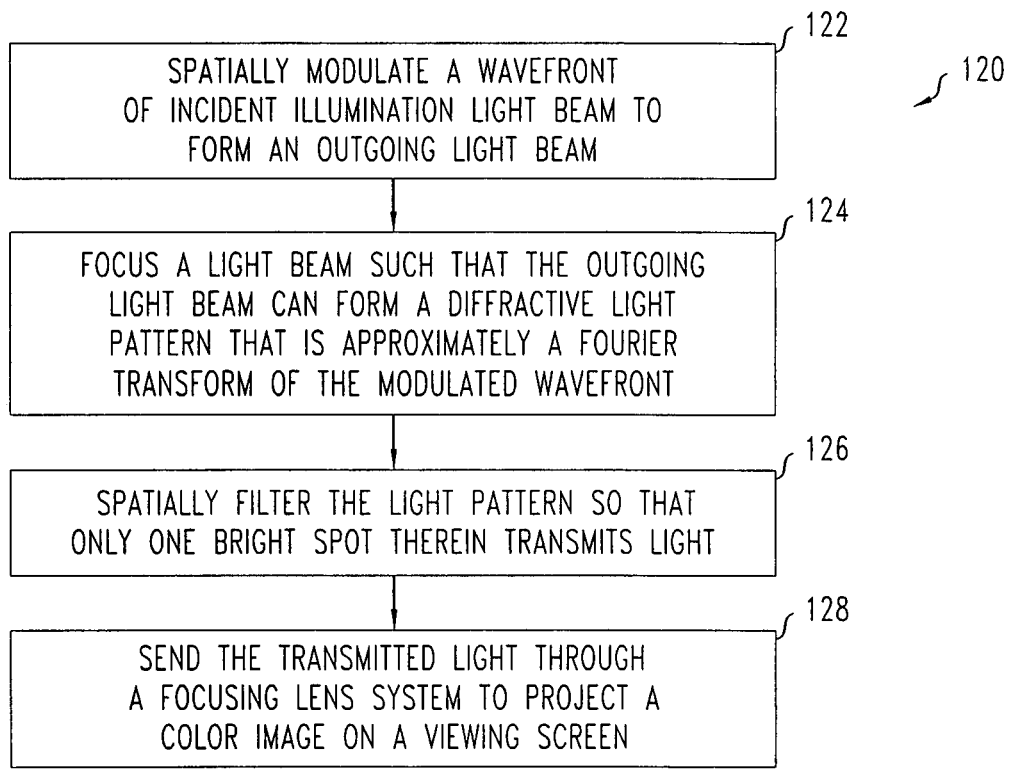
FIG. 13 is a flow chart for a method of image projection based on a one-to-one correspondence between pixels of a reconfigurable spatial light modulator array and pixels of an image-to-be-projected, e.g., as in apparatus of FIGS. 11A-11E.

FIG. 13 illustrates one method 120 of directly imaging a phase-modulated wavefront on a viewing screen, e.g., with the apparatus 10A-10E shown in FIGS. 11A-11E.

The method 120 includes phase or amplitude modulating a wavefront of an incident coherent illumination light beam to produce an outgoing light beam having a spatially phase-modulated wavefront, e.g., the outgoing light beam 44 (step 122). The modulating step 122 may involve effectively multiplying a wavefront of an incident illumination light beam 26 by a space dependent reflection factor $A \cdot \exp[i\Phi(m1, m2)]$ or by a space dependent transmission factor $A(m1, m2) \cdot \exp[i\Phi(m1, m2)]$ to produce the outgoing light beam 44. Here, A and A(m1, m2) are amplitudes, and $\Phi$(m1, m2) is a phase angle. Also, the integer-component vector (m1, m2) indexes spatial positions of pixels along the wavefront. The first and second components of the vector (m1, m2) correspond to row and column locations of either a single micro-mirror 34 or liquid crystal cell 34' or a local operating group of neighboring micro-mirrors 34 or liquid crystal cells 34'. Such a modulation may be performed by spatial light modulators such as the reconfigurable mirror array 16 of FIGS. 11A-11D or the reconfigurable liquid crystal array 16' of FIG. 11E. For the (m1, m2) micro-mirror 34 or liquid crystal cell 34', the corresponding phase Φ(m1, m2) and/or amplitude, i.e., A or A(m1, m2), may be evaluated based on the desired light intensity at the correspondingly located image pixel (m1, m2) at viewing screen 12.

The method 120 includes focusing a light beam such that the outgoing light beam can form a diffractive light pattern on a distant plane, e.g., a plane distant from the spatial light modulator, wherein the light pattern is approximately a Fourier transform of the modulated wavefront produced at the modulating step 122 (step 124). The distant plane may be, e.g., the focal plane of the lens system that causes the focusing, e.g., as shown in FIGS. 11A-11E. The focusing step 124 may be performed on a coherent illumination light beam to produce the converging light beam 26 incident on the spatial light modulator, e.g., the reconfigurable mirror array 16 in the apparatus 10C-10D of FIGS. 11C-11D. The focusing by the first focusing lens system 92 causes the outgoing light beam 44 to produce a diffractive light pattern in the distant plane 98 of FIGS. 11C-11D. The focusing step 124 may alternatively be performed on the light beam 44 that is outgoing from the spatial light modulator, e.g., as in the reconfigurable mirror arrays 16 of FIGS. 11A-11B and the reconfigurable liquid crystal array 16' of FIG. 11E. This later embodiment of the focusing step 124 also causes the outgoing light beam 44 to produce such a diffractive light pattern on the distant plane 98.

The method 120 includes spatially filtering the light from the diffractive light pattern so that only one bright spot therein substantially transmits light to the rest of the optical image projection system (step 126). In particular, the unfiltered light pattern has different bright spots due to the approximate 2D periodicity of the arrangement of micro-mirrors 34 or liquid crystal cells 34' in the reconfigurable spatial light modulator 16, 16'. The spatial filtering may involve, for example, filtering with the transmission filter 96 of FIGS. 11A-11E to block all but a single such diffractive order of the light pattern on the plane 98 from contributing to the image to be projected onto the viewing screen 12. In particular, the spatial filtering may be configured to transmit a bright spot of the zeroth order or of a higher order in the diffractive light pattern. If the spatial filtering transmits light from a higher order, light from either one or more than one of the bright spots of said higher order may also be transmitted. Indeed, transmitting light from more than one bright spot of the same order can increase the brightness of the image that is projected on the viewing screen 12.

The method 120 includes sending the spatially filtered light, i.e., from the unblocked bright spot(s) of the diffractive light pattern, through another focusing lens system to project a single color image onto a viewing screen (step 128). The image is typically a Fourier transform or an inverse Fourier transform of the light pattern transmitted by the spatial filtering step 126. The transmitting step 128 includes passing the spatially filtered light beam through focusing lens systems(s) 94, 100 in the apparatus 10A-10E of FIGS. 11A-11E.

Some embodiments of the method 120 include repeating the steps 122, 124, 126, and 128 for coherent illumination light beams of different colors, e.g., red, green and blue. Indeed, the beam's color may be rotated in round robin fashion for the successive performances of the steps 122, 124, 126, and 128 to produce color interleaving. Such color interleaving may be performed at a high enough frequency to cause a perception that a multi-colored image is projected onto the viewing screen, e.g., the viewing screen 12 of FIGS. 11A-11E.

Figure 14A:
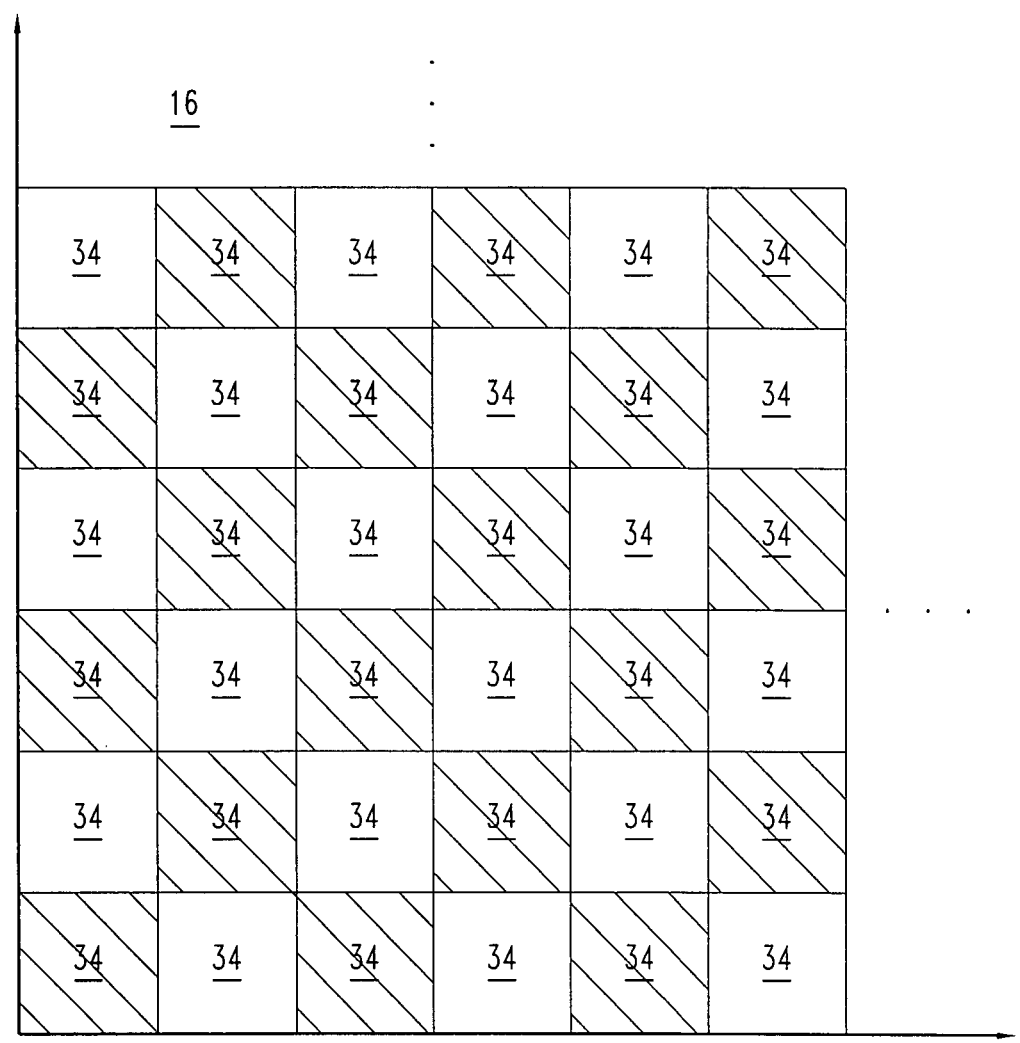
FIGS. 14A and 14B illustrate alternate ways of operating a reconfigurable spatial light modulator in the image projection method of FIG. 13.
Figure 14B:
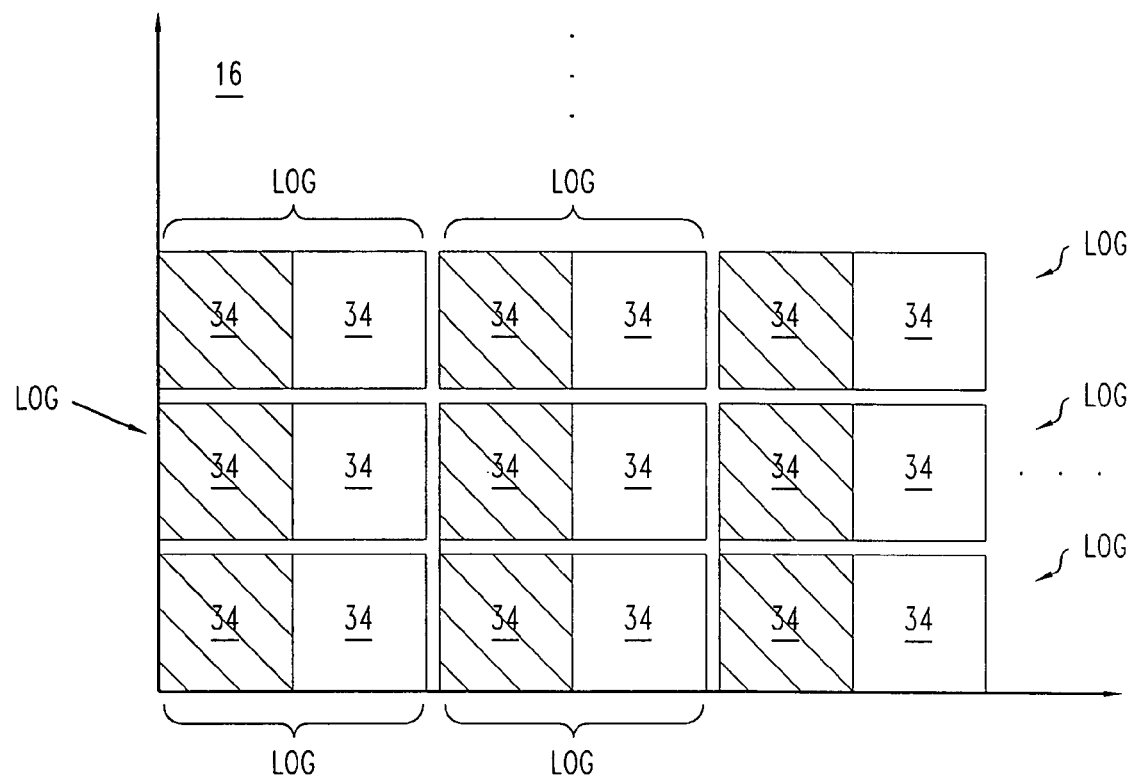

Various embodiments of the method 120 may implement the modulating step 122 differently. Two exemplary embodiments of the modulating step 122 are illustrated in FIGS. 14A and 14B. In each such embodiment, the transmission filter 96 may be configured to substantially transmit only the zeroth diffractive order of the light pattern on the plane 98 as illustrated in FIG. 12A.

Below, a micro-mirror 34 (liquid crystal cell 34') at row m1 and column m2 of the reconfigurable mirror array 16 is referred to as an even micro-mirror (even liquid crystal cell) if the sum (m1+m2) is even and is referred to as an odd micro-mirror (odd liquid crystal cell) if the sum (m1+m2) is odd. Even and odd micro-mirrors 34 (liquid crystal cells) are indicated in FIG. 14A as white squares and crosshatched squares, respectfully.

FIG. 14A illustrates an embodiment in which the modulating step 122 involves positioning each micro-mirror 34 or liquid crystal cell 34' separately based on the desired brightness of the corresponding pixel of the image-to-be-projected onto the viewing screen 12. In one such embodiment, the micro-mirrors 34 of the reconfigurable mirror array 16 would be aligned along a single plane during the modulating step 122 if the image-to-be-projected had a uniform nonzero brightness on the viewing screen 12. In this embodiment, the micro-mirrors 34 of the reconfigurable mirror array 16 would be maximally distant from said same single plane if the image-to-be-projected had a uniform brightness of zero on the viewing screen 12. In the later case, the distribution of the micro-mirrors 34 with respect to said single plane would form a checkerboard pattern as shown in FIG. 14A. In the checkerboard pattern, the odd micro-mirrors 34 are positioned to one side of the single plane, and the even micro-mirrors are positioned to the other side of the same single plane. In other situations where the brightness varies from pixel-to-pixel over the image-to-be-projected, the modulating step 122 would involve positioning each micromirror 34 at a distance from the same single plane in a manner that depends on the brightness of the corresponding pixel of the image-to-be-projected. In particular, if the desired light intensity I at a pixel of the image is I, then, the corresponding micro-mirror 34 of the reconfigurable mirror array 16 would be positioned to produce a relative phase, Φ, on the wavefront outgoing from that portion of the reconfigurable mirror array 16. Here Φ would be defined as follows.

$$\Phi = \pm \arccos([I/I_{max}]^{1/2}).$$

In the above equation, the ±sign indicates the side of the same plane, and $I_{max}$ is the maximum brightness of any pixel of the image-to-be-projected. The sign is positive for even micro-mirrors 34 and is negative for odd micro-mirrors 34, because the modulating step 122 would position such even and odd micro-mirrors 34 on opposite sides of the single plane on which they would be located for an image of uniform nonzero brightness.

FIG. 14B illustrates an embodiment in which the modulating step 122 involves positioning disjoint neighboring pairs of micro-mirrors 34 or liquid crystal cells 34' separately, i.e., local operating groups (LOGs). In FIG. 14B, the boundaries between local operating groups, LOG, are indicated by double lines, and the boundaries the between micro-mirrors 34 of one such embodiment are indicated by single lines. In each such local operating group, LOG, one micro-mirror 34 is indicated by a white square, and the other micro-mirror 34 is indicated by a crosshatched square. The micro-mirrors 34 indicated by white squares and crosshatched squares are moved differently during the modulation step 122.

In some such embodiments, the micro-mirrors 34, which are indicated by crosshatched squares are immobile, i.e., not MEMS actuated, and the micro-mirrors 34, which are indicated by white squares, are moveable by MEMS actuators. During the modulating step 122, each micro-mirror 34 corresponding to a white square is positioned by its MEMS actuator based on the brightness of the corresponding pixel of the image-to-be-projected. In particular, each such micro-mirror 34 is positioned to cause a relative phase change of $\Phi$ where $\Phi = 2 \cdot \arccos([I/I_{max}]^{1/2})$ on the wavefront incident thereon. That is, the mobile micro-mirror 34 of the local operating group is moved twice as far to produce for same pixel brightness than in the embodiment where each pixel of the reconfigurable mirror array 16 has a single micro-mirror 34.

In other such embodiments, both micro-mirrors 34 of an operating group may be MEMS actuated and mobile. Then, in each operating group, the two micro-mirrors 34 could be positioned to cause a relative phase change of $\Phi$ of $(2 \cdot \arccos([I/I_{max}]^{1/2})$, e.g., between the two micro-mirrors 34. In some such embodiments, the central positions of the micro-mirrors 34 of a local operating group may also be adjusted empirically to reduce diffraction-caused light contamination in pixels neighboring the pixel that corresponds to the local operating group in the image-to-be-projected. For example, such an adjustment may involve repositioning local operating groups in the vertical and/or horizontal directions to form a checkerboard/alternating pattern as much as possible.

Referring again to FIGS. 11A-11D, some embodiments of apparatus 10A-10D include a transmission filter 96 configured to transmit light in a selected nonzero order of the diffractive light pattern in the plane 98. In such embodiments, the micro-mirrors 34 of the reconfigurable mirror array 16 may be blazed, e.g., to increase the percentage of illumination light that is directed into the bright spot from which light is selectively transmitted by the transmission filter 96. Such blazing may involve tilting the reflective surfaces of said micro-mirrors 34 at a non-normal incident angle with respect to the incident light beam 26 and/or may involve etching or moving group of mirrors such to create staircases onto the reflective surfaces of said micro-mirrors or operating group 34 to simulate blazing.

In various embodiments of apparatus 10E of FIG. 11E, the individual liquid crystal cells 34' or local operating groups thereof may also be configured to produce the relative above-described phases on the incident light wavefront. In particular, the relative phases, $\Phi$, may depend on light intensities at the corresponding pixels of the desired image according to the same formulas, e.g., $\Phi = \arccos([I/I_{max}]^{1/2})$.

From the disclosure, drawings, and claims, other embodiments of the invention will be apparent to those skilled in the art.

What is claimed is:

1. An apparatus, comprising:
   a light source comprising a plurality of coherent sources, each coherent source being configured to emit light of a different color than the remaining of the coherent sources;
   a reconfigurable array of mirrors and MEMS actuators, each mirror being controlled by a corresponding one of the MEMS actuators that is able to translate the controlled mirror in a piston-like movement normal to the array; and
   wherein the light source is configured to illuminate the mirrors with a time division color-multiplexed light beam; and
   wherein the reconfigurable array is able to modulate a phase of a wavefront of the light beam in a spatially non-uniform and reconfigurable manner.

2. The apparatus of claim 1, wherein the light source is configured to vary the light beam between having a first color and having a second color at a frequency of greater than 20 Hertz.

3. The apparatus of claim 2, comprising a processor being configured to operate the MEMS actuators such that the mirrors of the array have a first spatial distribution of translations when the light beam has the first color and have a different second spatial distribution of translations when the light beam has the second color.

4. The apparatus of claim 1, further comprising:
   a planar viewing screen; and
   wherein the apparatus is configured to form an image on the viewing screen such that a human would observe the image to be temporally constant and have a superposition of the colors of the coherent sources.

5. The apparatus of claim 4, wherein the viewing screen is able to non-specularly reflect light incident thereon.

6. The apparatus of claim 1, further comprising:
   a beam splitter located to redirect a light beam from the light source towards the reconfigurable array; and
   a wave plate located between the beam splitter and the reconfigurable array.

7. The apparatus of claim 3,
   wherein diameters of the mirrors are less than 20 times a center wavelength of light produced by the light source; and
   wherein the processor is configured to operate the MEMS actuators such that the array forms a first image of a first color on a viewing screen and forms a second image of a second color on the viewing screen such that the first and second images have the same size.

* * * * *